United States Patent [19]

Maeda et al.

[11] Patent Number: 5,757,430
[45] Date of Patent: May 26, 1998

[54] ELECTRONIC VIEWER AND FILM CARRIER

[75] Inventors: Yutaka Maeda; Hiroshi Shimaya; Atsushi Misawa; Shigeru Kondo, all of Asaka, Japan

[73] Assignee: Fuji Photo Film Co., Ltd., Kanagawa, Japan

[21] Appl. No.: 258,087

[22] Filed: Jun. 10, 1994

[30] Foreign Application Priority Data

| Jun. 11, 1993 | [JP] | Japan | 5-165018 |
| May 31, 1994 | [JP] | Japan | 6-139563 |

[51] Int. Cl.$^6$ .......................... H04N 5/225; H04N 5/253
[52] U.S. Cl. .......................... 348/373; 348/96
[58] Field of Search .................. 348/373, 98, 97, 348/96; 353/68, 119, 26 R, 74, 95; 354/76, 80; 355/72, 74, 75; 358/332

[56] References Cited

U.S. PATENT DOCUMENTS

| 4,458,270 | 7/1984 | Kuno | 348/373 |
| 4,819,073 | 4/1989 | Bridges | 348/373 |
| 4,916,550 | 4/1990 | Miyake | 348/373 |
| 4,969,733 | 11/1990 | Jewison | 353/119 |
| 5,218,439 | 6/1993 | Mizoguchi et al. | 354/76 |
| 5,247,330 | 9/1993 | Ohyama et al. | 355/75 |
| 5,293,242 | 3/1994 | Mamiya | 348/373 |
| 5,471,238 | 11/1995 | Bae | 348/373 |

FOREIGN PATENT DOCUMENTS

| 42 38 395 | 5/1993 | Germany. |
| 1235940 | 9/1989 | Japan .................. G03B 27/62 |
| 5-136942 | 6/1993 | Japan. |
| 5-136955 | 6/1993 | Japan. |
| 5-136956 | 6/1993 | Japan. |
| 5-141144 | 6/1993 | Japan. |
| 5-141146 | 6/1993 | Japan. |
| 5-145707 | 6/1993 | Japan. |
| 5-160963 | 6/1993 | Japan. |
| 5-167783 | 7/1993 | Japan. |
| 5-167787 | 7/1993 | Japan. |
| 2 260 462 | 4/1993 | United Kingdom. |

*Primary Examiner*—Wendy Garber

[57] ABSTRACT

In order to make it possible to see both a film accommodated in a film carrier and a film accommodated in a sheath, a carrier holder is rotatably provided in the upper portion of a viewer main body containing an imaging optical system, a CCD and a signal processing circuit, a carrier inlet is formed in the carrier holder, and head covers are mounted on the carrier holder so as to be capable of being opened and closed. The head covers are provided with a lighting lamp. Supporting arms are mounted on both sides of the viewer main body so as to be capable of being opened and closed.

66 Claims, 34 Drawing Sheets

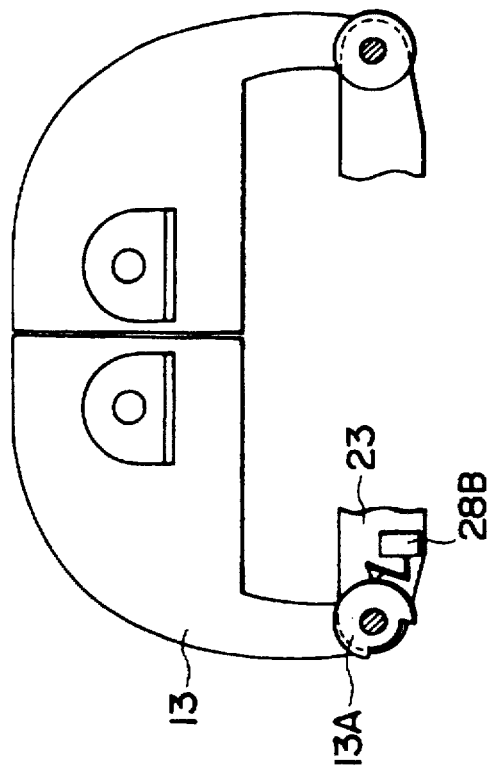
Fig.30a
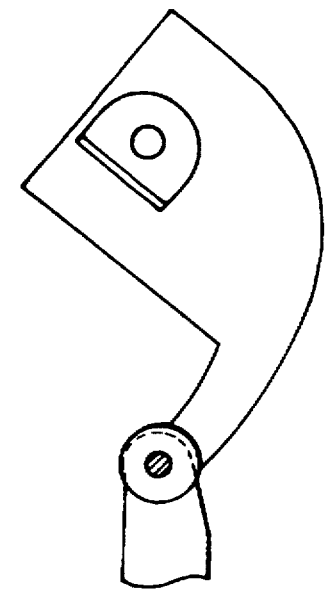
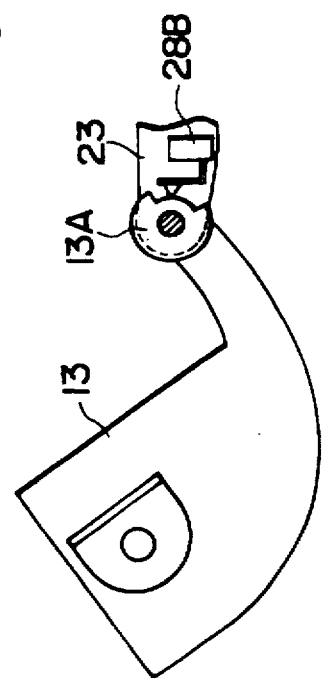
Fig.30b

ELECTRONIC VIEWER AND FILM CARRIER

BACKGROUND OF THE INVENTION

1. Field of the Invention

The present invention relates to an electronic viewer used for imaging a subject such as a negative or positive film or a document using a solid state electronic imaging device, applying a video signal obtained by the imaging to a display device and displaying an image of the subject on the display device to see or check the subject, and a film carrier used for holding, when a film is used in the electronic viewer, the film.

2. Description of the Related Art

In order to confirm, check or select an image appearing on a negative film, the negative film is difficult to understand even if it is seen with the naked eye. Therefore, an electronic viewer (an electronic still camera or a video camera) for imaging the negative film by a solid state electronic imaging device, converting a video signal obtained by the imaging into a video signal representing a positive image by a negative/positive inversion circuit and outputting the same has been known. The video signal outputted from the electronic viewer is applied to a display device, thereby to make it possible to see a negative image on the negative film as a positive image and in an enlarged manner.

When the negative film is used in such an electronic viewer, the negative film is accommodated in a film carrier. When the negative film is accommodated in the film carrier, the film may be damaged or made dirty.

Since the film is generally accommodated in a sheath (a transparent or translucent film cover), it is preferable that an image of the film can be seen using an electronic viewer in a state where the film is accommodated in the sheath from the point of view of protection of the film.

SUMMARY OF THE INVENTION

An object of the present invention is to provide an electronic viewer capable of seeing a film even in a state where the film is accommodated in a film carrier or in a state where it is accommodated in a sheath.

Another object of the present invention is to make it possible to image not only a film but also a subject such as a sheet or a document using the electronic viewer.

Still another object of the present invention is to provide a film carrier suitable for the electronic viewer.

An electronic viewer is the concept including a part or all of a construction of an electronic camera (including an electronic still camera, a video camera, and a still video camera), an image processing apparatus, and an electronic projector for imaging a document or the like to display the same on a large-sized display device.

Examples of the film include a negative film, a positive film and a slide for slide projection.

An electronic viewer according to the present invention comprises an imaging optical system, a solid state electronic imaging device for outputting an image signal representing an image of light incident through the imaging optical system, a viewer main body containing an image processing circuit for converting the image signal outputted from the solid state electronic imaging device into a video signal which can be supplied to a display device and outputting the same, a film carrier supporting member provided for the viewer main body for holding a film carrier in a position ahead of the imaging optical system so as to be attachable and detachable, a light source provided for the viewer main body so as to be movable between a first position ahead of the film held in the film carrier supporting member and a second position beside the viewer main body, and a diffusing plate supporting member for holding a diffusing plate in a position between the light source in the first position and the position of the film held in the film carrier supporting member.

In a preferred embodiment of the present invention, a head cover for covering the front of the imaging optical system is pivotably mounted on the viewer main body and is capable of being opened and closed, and the head cover is provided with the light source. Specifically, the head cover constitutes a lamp house.

The diffusing plate can be fixedly provided on the front surface of the light source. In this case, the diffusing plate supporting member will be also used for a member for movably holding the light source.

The diffusing plate can be also provided for a part of the viewer main body so as to be capable of being inserted and drawn out. In this case, the diffusing plate supporting member will be provided for the viewer main body and hold the diffusing plate so as to be attachable and detachable.

The diffusing plate can be also provided for the film carrier. In this case, the film carrier supporting member will be also used for the diffusing plate supporting member.

The electronic viewer according to the present invention is used as follows.

When a film accommodated in the film carrier is seen, the film carrier is inserted into or mounted on the film carrier supporting member. The light source is positioned in the first position ahead of the film carrier thus held.

Light from the light source is projected into the film through the diffusing plate, and light transmitted by the film is incident on the solid state electronic imaging device through the imaging optical system. An image signal representing an image appearing on the film is outputted from the solid state electronic imaging device, the image signal is applied to the image processing circuit, and a video signal suitable for display is outputted from the image processing circuit. If the video signal is inputted to the display device, the image of the film is displayed on the display screen of the display device.

The image processing circuit preferably comprises a negative/positive inversion circuit. If it is desired to see a positive image in a case where the film is a negative film, a video signal representing a positive image is obtained by operating the negative/positive inversion circuit.

When a film is accommodated in the sheath, the sheath containing the film is placed on the upper surface of a light box. The light box has a light source in its inner part, and the diffusing plate is disposed on the upper surface of the light box.

The light source of the electronic viewer is moved to the second position beside the viewer main body. The electronic viewer is so disposed that the imaging optical system of the electronic viewer faces the film in this state (is placed on the upper surface of the light box in its inverted state).

The video signal representing the image of the film imaged by the solid state electronic imaging device is outputted from the electronic viewer, and the image of the film is displayed on the display device.

The film may be directly placed on the upper surface of the light box without being accommodated in the sheath.

Since the electronic viewer according to the present invention can be used in the above described manner, it is possible to image the film accommodated in the film carrier using the light source provided for the electronic viewer and display the same on the display device, or to image the film contained in the sheath placed on the upper surface of the light box and display an image of the film on the display device.

When the electronic viewer is used in a state where the film is accommodated in the film carrier, it is possible to see a sharp image of the film on the display device. When the electronic viewer is used in a state where the film is accommodated in the sheath, the film may not be damaged or made dirty, although the image displayed on the display device is slightly inferior in quality. The later state of use is suitable in a case where it is desired to roughly grasp the image appearing on the film.

In a preferred embodiment of the present invention, the electronic viewer comprises at least two supporting arms capable of being opened and closed, and the supporting arms are pivotably mounted on the viewer main body.

The supporting arms are suited to support the electronic viewer and hold the same so as not to easily upset. For example, the supporting arms are utilized when the electronic viewer is placed on a desk or the like in the state of use where the film carrier is mounted thereon.

In a still preferred embodiment of the present invention, the supporting arms are pivotably mounted so as to be capable of being opened to positions where they support the viewer main body in a state where the viewer main body is inverted, and can be fixed to the positions where they support the viewer main body.

A document is placed on, for example, a desk, and the viewer main body positioned directly above the document can be supported by the supporting arms so that the document can be imaged. This state of use makes it possible to image and display not only a film but also a larger document than the film.

Furthermore, it is possible to fix the electronic viewer to a stand and image a document placed below the viewer. The state of use is useful particularly in the electronic projector.

The present invention further provides a film carrier. The film carrier has a portion for receiving and holding a film, and a diffusing plate is provided on one surface of the film carrier in a range covering at least a frame on the film held in the holding portion.

One surface of the film carrier may be constituted by a diffusing plate, or a diffusing plate may be mounted on the existing film carrier.

The film carrier is utilized in the electronic viewer. If the film carrier is used, the electronic viewer need not be provided with the diffusing plate.

The foregoing and other objects, features, aspects and advantages of the present invention will become more apparent from the following detailed description of the present invention.

BRIEF DESCRIPTION OF THE DRAWINGS

FIG. 20 is a cross sectional view showing a structure of an assembled carrier holder;

FIG. 21 is a cross sectional view taken along a line XXI—XXI in FIG. 20;

FIG. 22 is an exploded perspective view showing a part of an electronic viewer;

FIG. 23 is an exploded perspective view showing a supporting arm;

FIG. 24 is an enlarged sectional view showing a base end of the supporting arm shown in FIG. 23;

FIG. 25 is an enlarged sectional view showing another example of the base end of the supporting arm; and FIG. 26 is an enlarged sectional view showing still another example of the base end of the supporting arm;

FIG. 27 to 30b illustrate a third modified example, where

FIG. 27 is an enlarged exploded perspective view of a carrier holder showing a state where a carrier detecting switch is mounted;

FIG. 28 is a block diagram showing a part of electric circuitry in an electronic viewer;

FIG. 29 is a perspective view of a carrier holder showing a state where a head cover opening and closing sensing switch is mounted; and FIG. 30a to 30b are diagrams showing another state in which the head cover opening and closing sensing switch is mounted, where FIG. 30a illustrates a state where head covers are closed, and FIG. 30b illustrates a state where head covers are opened;

FIG. 31 is a perspective view, which corresponds to FIG. 2, showing an electronic viewer;

FIG. 32 illustrates an opening and closing positioning mechanism of supporting arms;

FIG. 33 is an exploded perspective view showing a part of the supporting arm;

FIG. 34 is a block diagram showing the electrical configuration of the electronic viewer;

FIG. 35 is a perspective view showing a fifth manner in which the electronic viewer is used;

FIG. 36 is a perspective view, which corresponds to FIG. 16, showing a second manner in which the electronic viewer is used;

FIG. 37 is a perspective view showing another example of a negative carrier;

FIG. 38 is an enlarged sectional view showing a head portion of the electronic viewer; and FIG. 39 is an enlarged sectional view showing another construction of the head portion of the electronic viewer.

DESCRIPTION OF THE PREFERRED EMBODIMENTS

Figure 1:
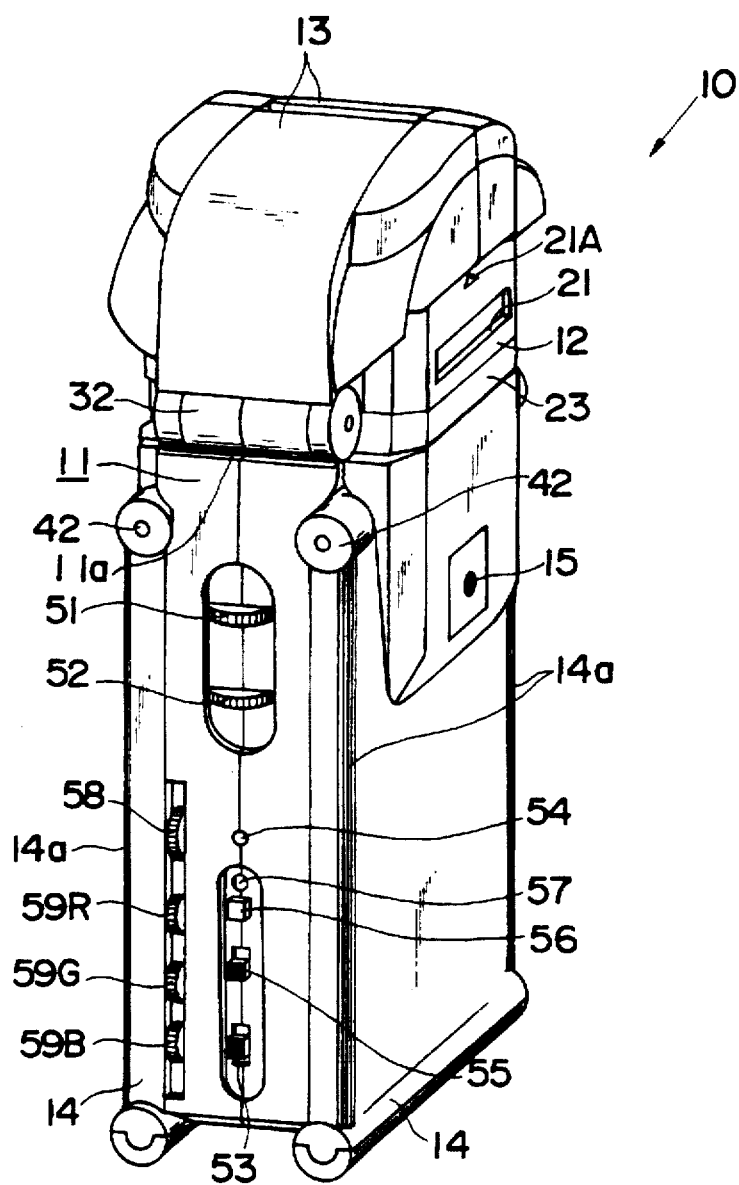
FIG. 1 is a perspective view showing an electronic viewer.
Figure 2:
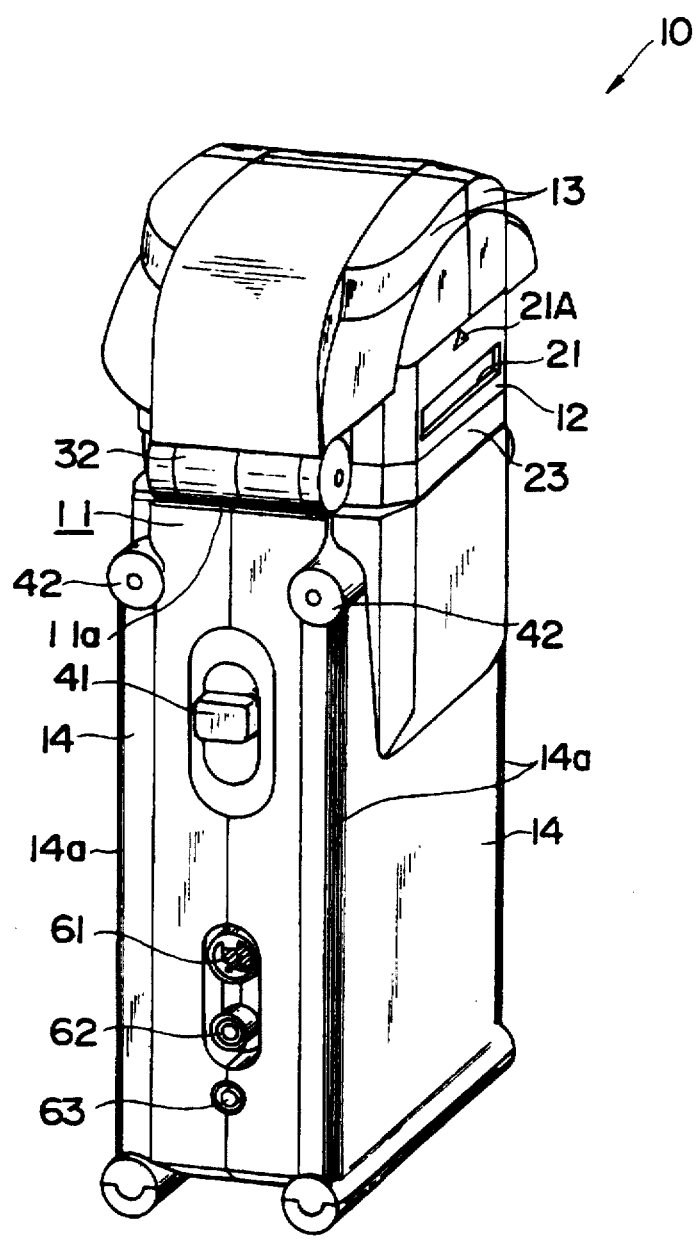
FIG. 2 is a perspective view showing an electronic viewer viewed from another angle.
Figure 3:
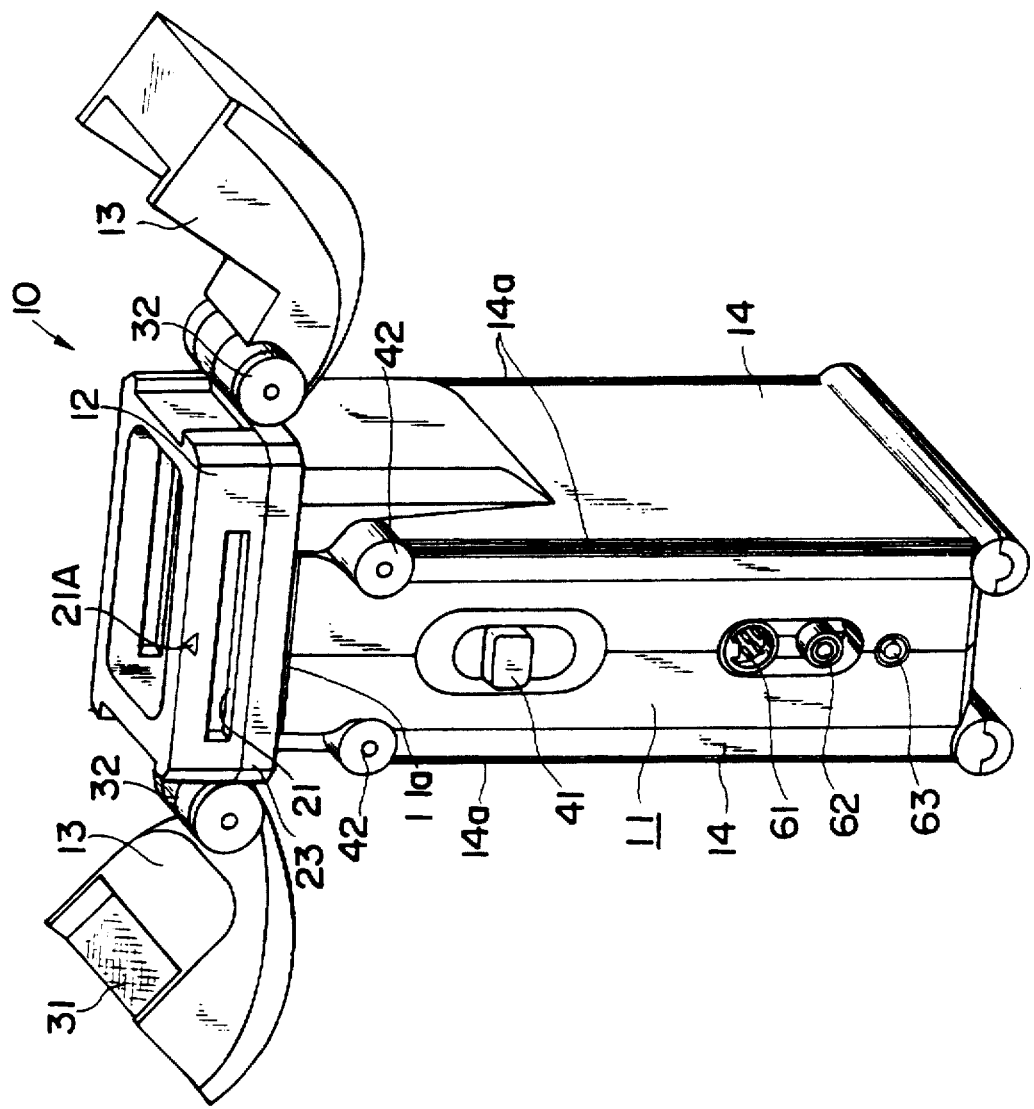
FIG. 3 is a perspective view showing a state where head covers are opened.

FIG. 1 and 2 are perspective views showing the entirety of an electronic viewer, which are respectively viewed from opposite side surfaces. FIG. 3 shows a state where a carrier holder is rotated through 90° and head covers are opened.

Referring to FIG. 1 to 3, an electronic viewer 10 comprises a viewer main body 11 in a substantially rectangular parallelepiped shape. The viewer main body 11 contains an imaging optical system, a CCD (Charge Coupled Device) serving as a solid state electronic imaging device (image sensing device), a signal processing circuit, a power supply circuit and the like as described later. In the figures, the imaging optical system is positioned in the upper portion of the viewer main body 11. Consequently, the viewer main body 11 is formed with an opening at the central portion of the upper surface thereof.

A carrier holder 12, together with a base 23, is mounted on the upper portion of the viewer main body 11 so as to be rotatable (in the range of ±90°). The carrier holder 12 and the base 23 are substantially square frames, and are provided with holes extending in the vertical direction. The details of the structure of the assembled carrier holder 12 and base 23 will be described later.

Two parallel sidewalls of the carrier holder 12 are provided with a carrier inlet (/outlet) 21. A negative carrier or a slide carrier as described later is inserted into the carrier inlet 21 so as to be attachable and detachable. The base 23 is provided with a cover glass 22 so as to block up the above described hole of the carrier holder 12 in a position slightly below the carrier inlet 21 (see FIG. 4). The cover glass 22 protects the imaging optical system housed in the upper portion of the viewer main body 11. In addition, the carrier holder 12 is provided with a positioning mark 21A at a position above the center of the carrier inlet 21.

Head covers 13 are pivotably mounted on two other sidewalls, which are not provided with the carrier inlet 21, of the carrier holder 12 by hinges 32 provided for the base 23 and are capable of being opened and closed. The head covers 13 are provided with a lighting lamp 31 therein.

When the head covers 13 are closed (see FIG. 1 or 2), they completely cover the opening on the upper surface of the viewer main body 11. When the head covers 13 are fully opened in a state where the carrier holder 12 is rotated through 90° (see FIG. 3), they are positioned at a height equal to or slightly less than the upper surface of the carrier holder 12. The hinges 32 are rigidly formed. The head covers 13 are held in a position or posture where they are closed or are opened to an arbitrary angle by a friction force in the hinges 32.

Figure 5:
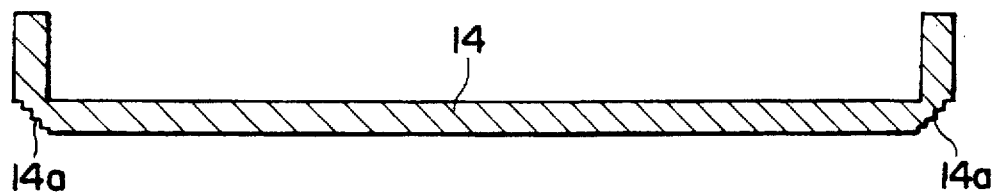
FIG. 5 is an enlarged transverse cross section showing a supporting arm.

Supporting arms 14 are mounted on two parallel side surfaces of the viewer main body 11 so as to be capable of being opened and closed at their upper ends by hinges 42. An opening and closing positioning mechanism of the supporting arms 14 will be described in detail later. In a state where the supporting arms 14 are closed as shown, the supporting arms 14 are along the side surfaces of the viewer main body 11, and their lower ends protrude downward from a lower end of the viewer main body 11. FIG. 5 is a transverse sectional view showing the supporting arm 14. Portions on both sides of the supporting arm 14 are bent at right angles so as to embrace the other side surface of the viewer main body 11. The outside of the bent portion is formed in a step shape as viewed in transverse cross section. Respective steps of a step-shaped portion 14a extend in the vertical direction like stripes. These step-shaped portions 14a reflect illumination light outward, as can be seen from the later description.

A stand mounting screw hole 15 used in mounting the electronic viewer 10 on a stand is formed in one of the supporting arms 14.

Particularly referring to FIG. 1, a focusing dial 51, a zoom dial 52, a power supply switch 53, a power supply indicator lamp 54, a negative black-and-white/negative/positive changeover switch 55, a tone-of-color/brightness automatic control button 56, a tone-of-color/brightness automatic control indicator lamp 57, a brightness adjustment dial 58, and tone-of-color adjustment dials 59R, 59G and 59B are provided on another surface, on which the supporting arms 14 are not mounted, of the viewer main body 11.

Referring to FIG. 2 and 3, an unlocking button 41, an S video signal output terminal 61, a V video signal output terminal 62, and a DC input terminal 63 are provided on still another side surface of the viewer main body 11.

Positioning slanting planes 11a are respectively formed on the upper portions of the side surfaces of the viewer main body 11. The slanting planes 11a determine the angle of opening of the head covers 13.

Figure 4:
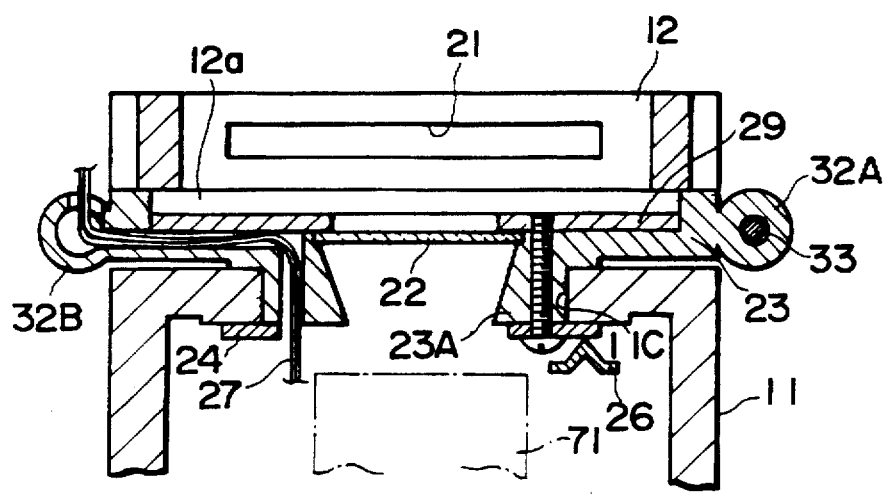
FIG. 4 is a cross sectional view showing a structure of an assembled carrier holder.

FIG. 4 shows the structure of the assembled carrier holder 12. Also referring to FIG. 9, a base 23 has a projected ring portion 23A at its center, and the projected ring portion 23A is rotatably fitted in a circular opening 11C formed in an upper end surface of the viewer main body 11. A step is formed on the inside of the projected ring portion 23A of the base 23, and the cover glass 22 is housed in the step. The base 23 is also formed with a recess, and a guide 29 made of a material having elasticity is housed in the recess. A rail 12a formed in the carrier holder 12 is slidably fitted in holding portions formed on both sides of the guide 29. The rail 12a is rigidly fitted in the holding portion of the guide 29 by the elasticity of the guide 29. The base 23, the guide 29 and the carrier holder 12 are respectively formed with rectangular windows accepting an image of incident light at their central portions. Since the carrier holder 12 is movable relative to the guide 29, trimming of an image obtained by imaging is made possible.

A peripheral edge of the circular opening 11C formed in the upper end surface of the viewer main body 11 is interposed between the base 23 and an end plate 24, and the guide 29, the base 23 and the end plate 24 are fastened at three positions by set screws 25. Since the peripheral edge of the opening is interposed between the base 23 and the end plate 24 relatively loosely, the carrier holder 12 (and the base 23) are rotatable relative to the viewer main body 11.

Two radial grooves are formed spaced at an angle of 90° on the lower surface of the end plate 24. A click spring 26 is fixed to a supporting member (not shown) provided for the viewer main body 11, and is in contact with the lower surface of the end plate 24. The carrier holder 12 is positioned in two positions where the click spring 26 is fitted in the grooves on the lower surface of the end plate 24. Stoppers (not shown) for preventing the carrier holder 12 from being rotated through not less than 90° is provided at appropriate portions of the viewer main body 11.

Two cylindrical portions 32A and 32B constituting the hinge 32 are formed in the base 23. Two cylindrical portions 32C and 32D are also formed in the head cover 13. The cylindrical portion 32A is positioned between the cylindrical portions 32C and 32D, and a screw 33 is inserted into these cylindrical portions. The screw 33 is fitted in a female screw formed inside the cylindrical portion 32D. On the other hand, a groove is formed in the cylindrical portion 32B which is not related to a hinge function. A wire 27 for supplying current for the lighting lamp 31 provided for the head covers 13 leads to the head cover 13 through the hole formed in the base 23, a groove 23B formed on the inner surface of the base 23, the groove of the cylindrical portion 32B and a hole formed in the cylindrical portion 32D, and extends to the lighting lamp 31.

Figure 6:
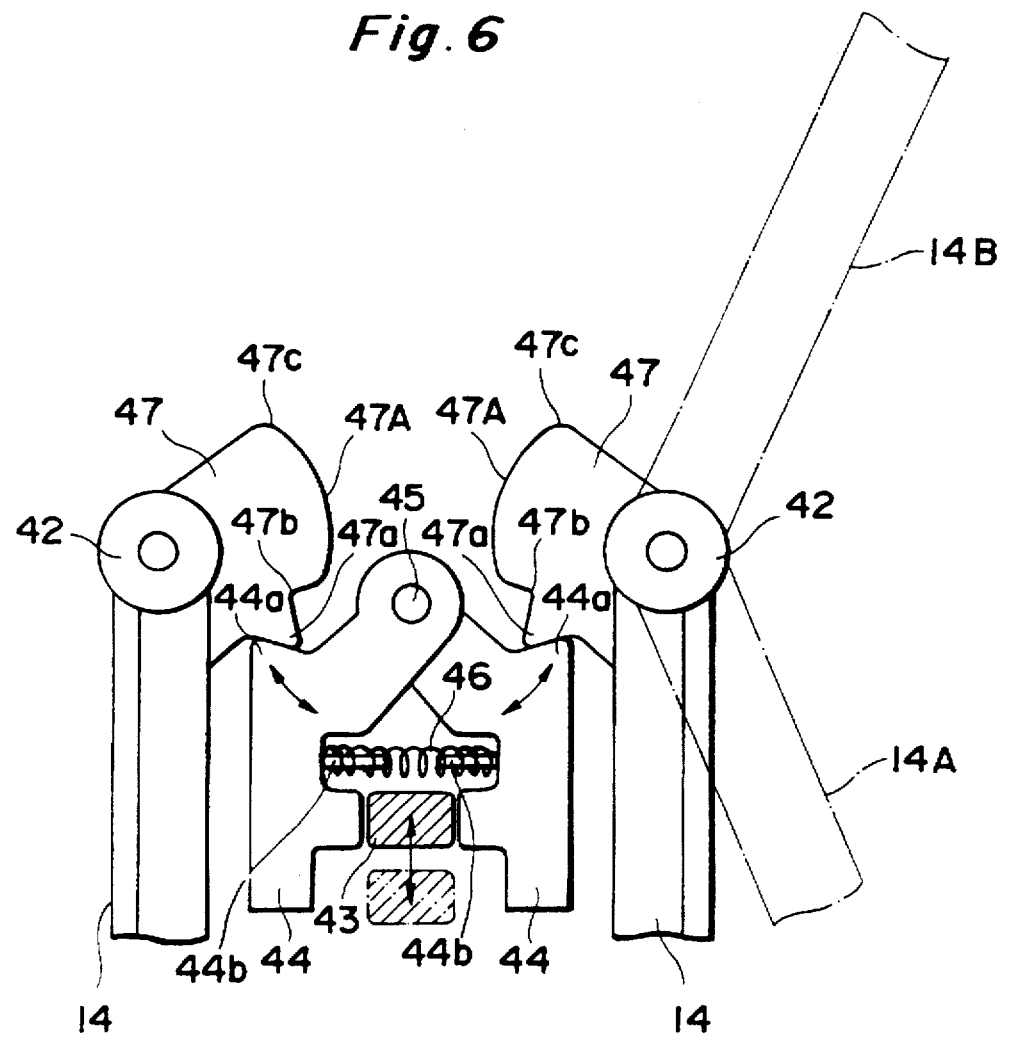
FIG. 6 is an opening and closing positioning mechanism of supporting arms.

FIG. 6 shows an opening and closing positioning mechanism of the supporting arms 14. Also referring to FIG. 7 and 8, a cam 47 is formed integrally with each of the supporting arms 14 in an upper end of the supporting arm 14 (a portion of the hinge 42). The cam 47 comprises a circular arc-shaped edge 47A centered at the center of the hinge 42. A groove-shaped notch 47b is formed in a lower end of the circular arc-shaped edge 47A, and a portion 47a projected in a triangular shape is provided contiguously with the notch 47b. An upper end of the circular arc-shaped edge 47A is indicated by reference numeral 47c.

On the other hand, two symmetrical levers 44 are provided in positions between both the supporting arms 14, and the levers 44 are pivotably supported by a supporting shaft 45 in their upper ends. The supporting shaft 45 is supported by an appropriate member of the viewer main body 11 (a bearing 126 in a half body 11B). A helical compression spring 46 is interposed between receiving portions 44b of the levers 44, and both the levers 44 are urged outward by the helical compression spring 46. In addition, a locking plate 43 which is interlocked with an unlocking button 41 is provided between projections of both the levers 44. Specifically, the locking plate 43 and the unlocking button 41 are fixed to both surfaces of a slide 41A. The slide 41A is always held in its locked position by a spring 48. The lever 44 comprises a portion 44a projected in a triangular shape.

In a position indicated by a solid line (see FIG. 6) where the locking plate 43 is positioned between the projections of the levers 44, the projected portion 44a of the lever 44 and the projected portion 47a of the cam 47 are in contact with each other. Consequently, the supporting arms 14 cannot be opened. Therefore, the supporting arms 14 are held in their closed positions indicated by a solid line.

If the unlocking button 41 is depressed downward, the locking plate 43 is also moved to a position indicated by dots and dashes lines (see FIG. 6). Consequently, locking is released. Therefore, the levers 44 can be moved nearer to each other against the helical compression spring 46.

If both the supporting arms 14 are opened sideward, the projected portion 47a of the cam 47 is getting onto the projected portion 44a of the lever 44 while depressing the lever 44. If the projected portion 47a of the cam 47 gets over the projected portion 44a of the lever 44, the projected portion 44a enters the notch 47b of the cam 47. This is a first stable position of the supporting arms 14 which is indicated by dots and dashes lines 14A. The supporting arms 14 are held in their slightly opened postures.

If both the supporting arms 14 are further opened, the projected portion 44a of the lever 44 moves along the circular arc-shaped edge 47A of the cam 47, finally leading to the upper end 47c thereof. In the upper end 47c, the projected portion 44a comes off the circular arc-shaped edge 47A, to be locked in a linear edge in the radial direction of the cam 47. In this position, the supporting arm 14 is held in a stable posture again. This is a second stable position of the supporting arms 14 which is indicated by dots and dashes lines 14B. The supporting arms 14 are significantly opened.

In the first and second stable positions, the locking plate 43 is returned to its original position indicated by a solid line. The locking plate 43 is so urged as to be returned to the original position by the spring 48.

Figure 7:
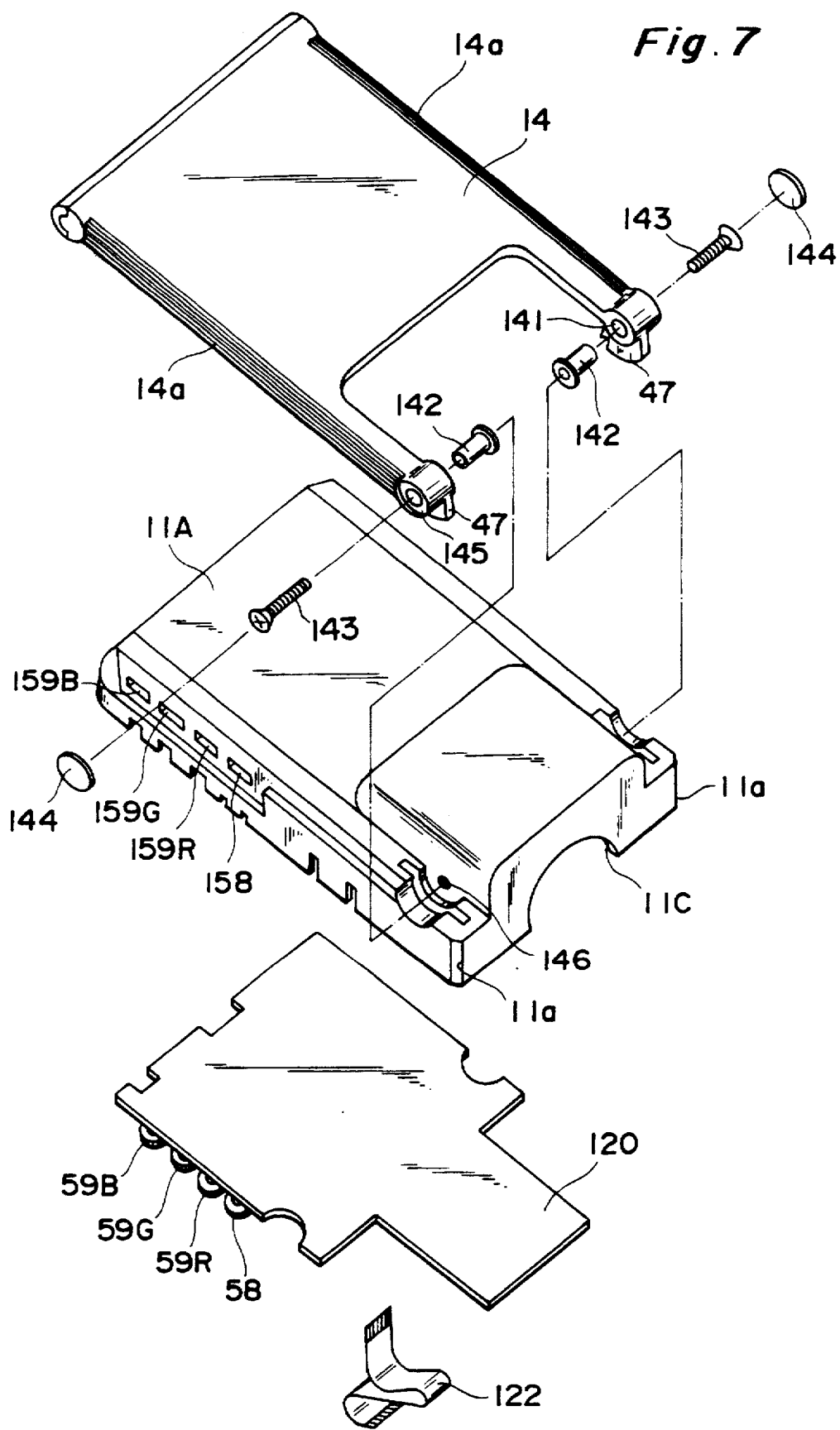
FIG. 7 is an exploded perspective view showing an electronic viewer.
Figure 8:
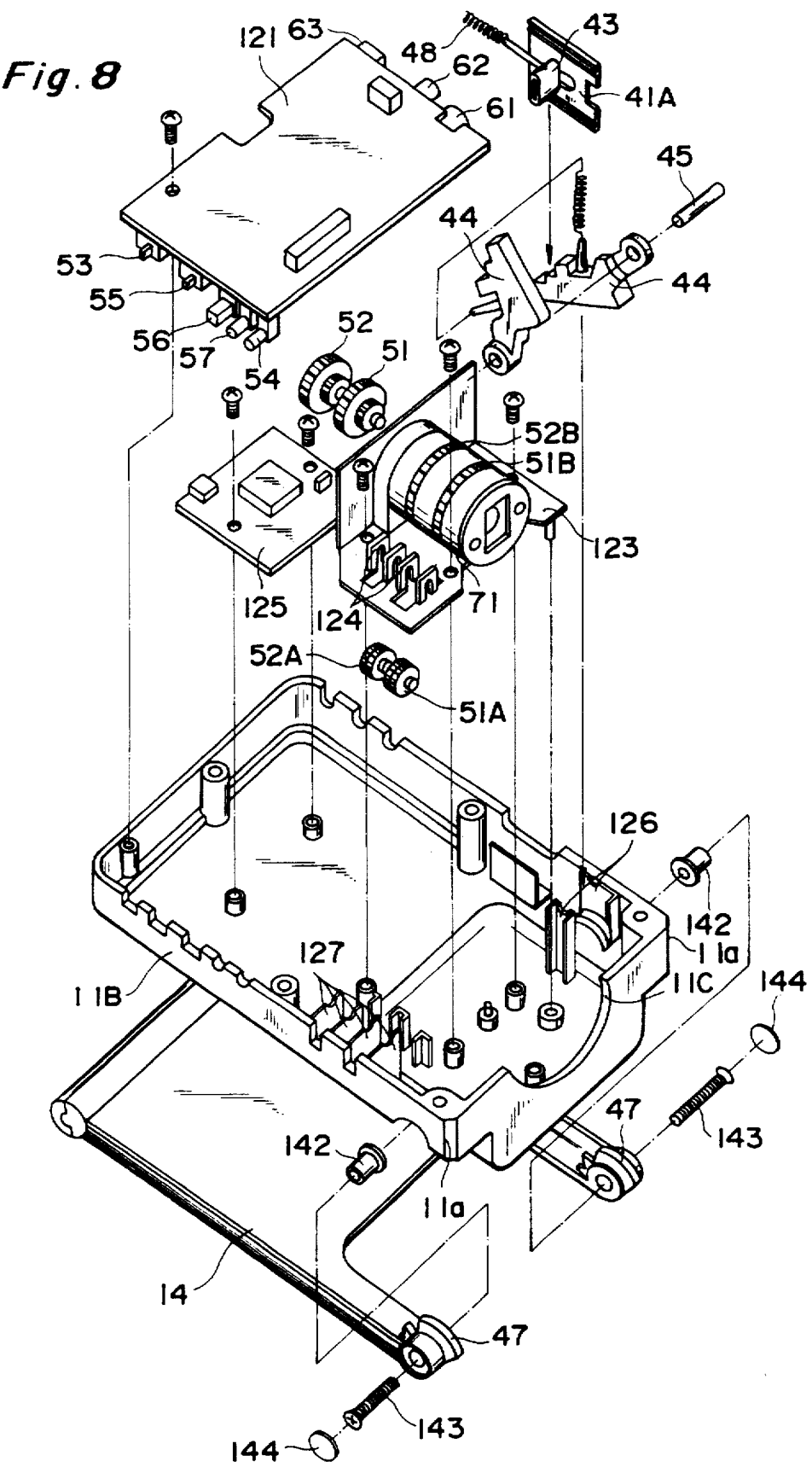
FIG. 8 is an exploded perspective view showing the electronic viewer.
Figure 9:
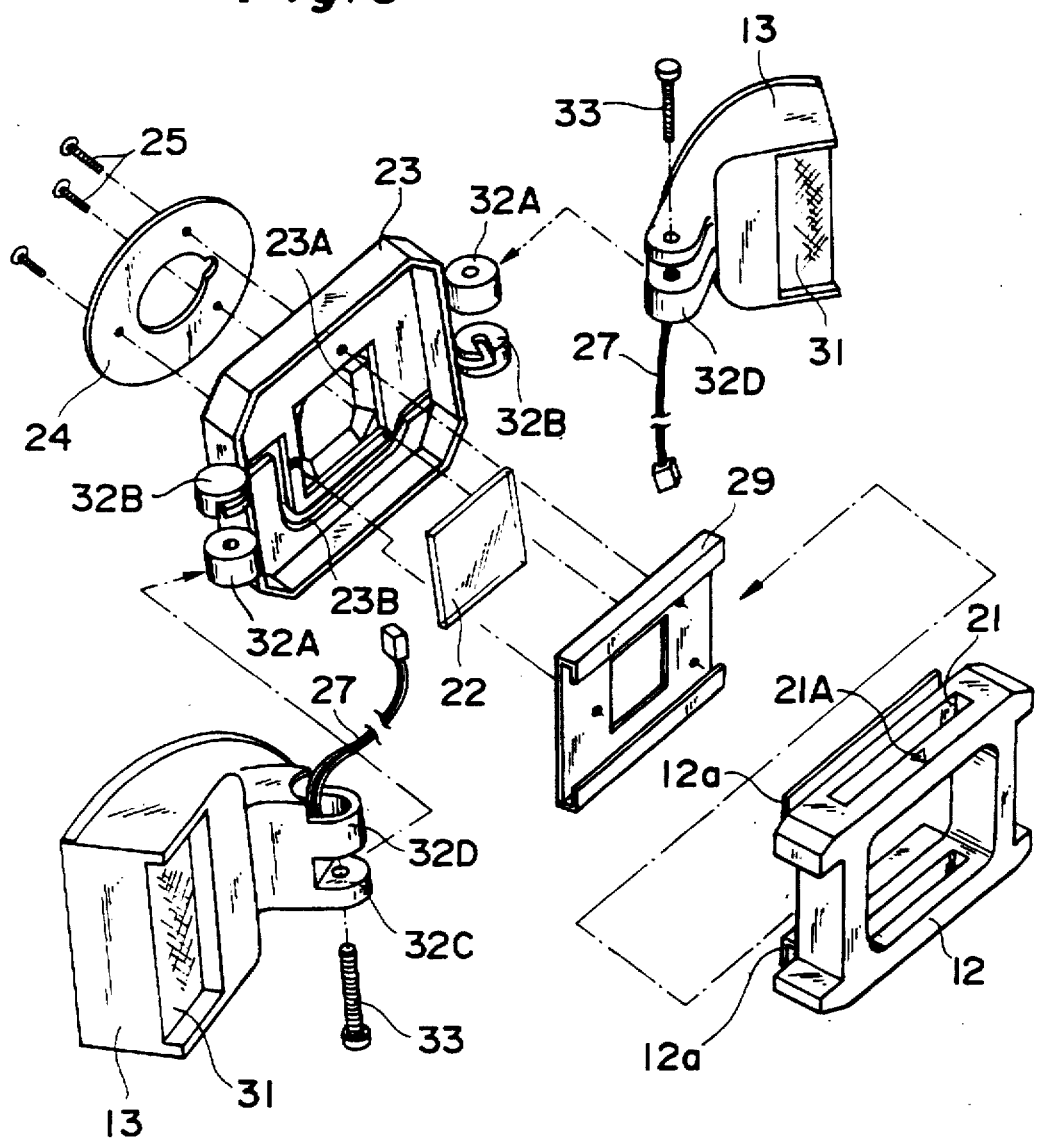
FIG. 9 is an exploded perspective view showing the electronic viewer.

FIG. 7 to 9 are exploded views showing the overall electronic viewer 10. Only portions which have not been referred to will be described briefly. The viewer main body 11 comprises two half bodies 11A and 11B. Collars 142 respectively enter holes 141 provided in upper ends of the supporting arm 14. A screw 143 passes through the collar 142. The screw 143 is fitted in a female screw 146 formed in the half body 11A. A cap 144 is fitted in a recess 145 formed on the outside of the hole 141, to conceal the head of the screw 143. Consequently, the hinge 42 is constructed. The dials 58, 59R, 59G and 59B are provided for a main substrate 120, and their parts are respectively projected outward from windows 158, 159R, 159G and 159B formed in the half body 11A. The main substrate 120 and a switch substrate 121 are connected to each other by flexible wiring 122.

The switch substrate 121 is provided with the switches 53 and 55, the button 56, the indicator lamps 54 and 57, and the terminals 61, 62 and 63. Power supply circuits 84 and 85 (see FIG. 10) and the like are mounted on an inverter substrate 125. A lens unit 123 is provided with an imaging optical system 71. Gears 51B and 52B are provided in a cylindrical portion of the imaging optical system 71. The gears 51B and 52B are respectively engaged with the focusing dial 51 and the zoom dial 52 through idlers 51A and 52A. The idlers 51A and 52A and the dials 51 and 52 are rotatably supported by bearings 124 and 127, respectively. Although the cams 47 are provided in the two upper ends of the supporting arm 14, only one of the cams 47 is actually used. The two cams 47 are provided so as to share the right and left supporting arms 14.

Figure 10:
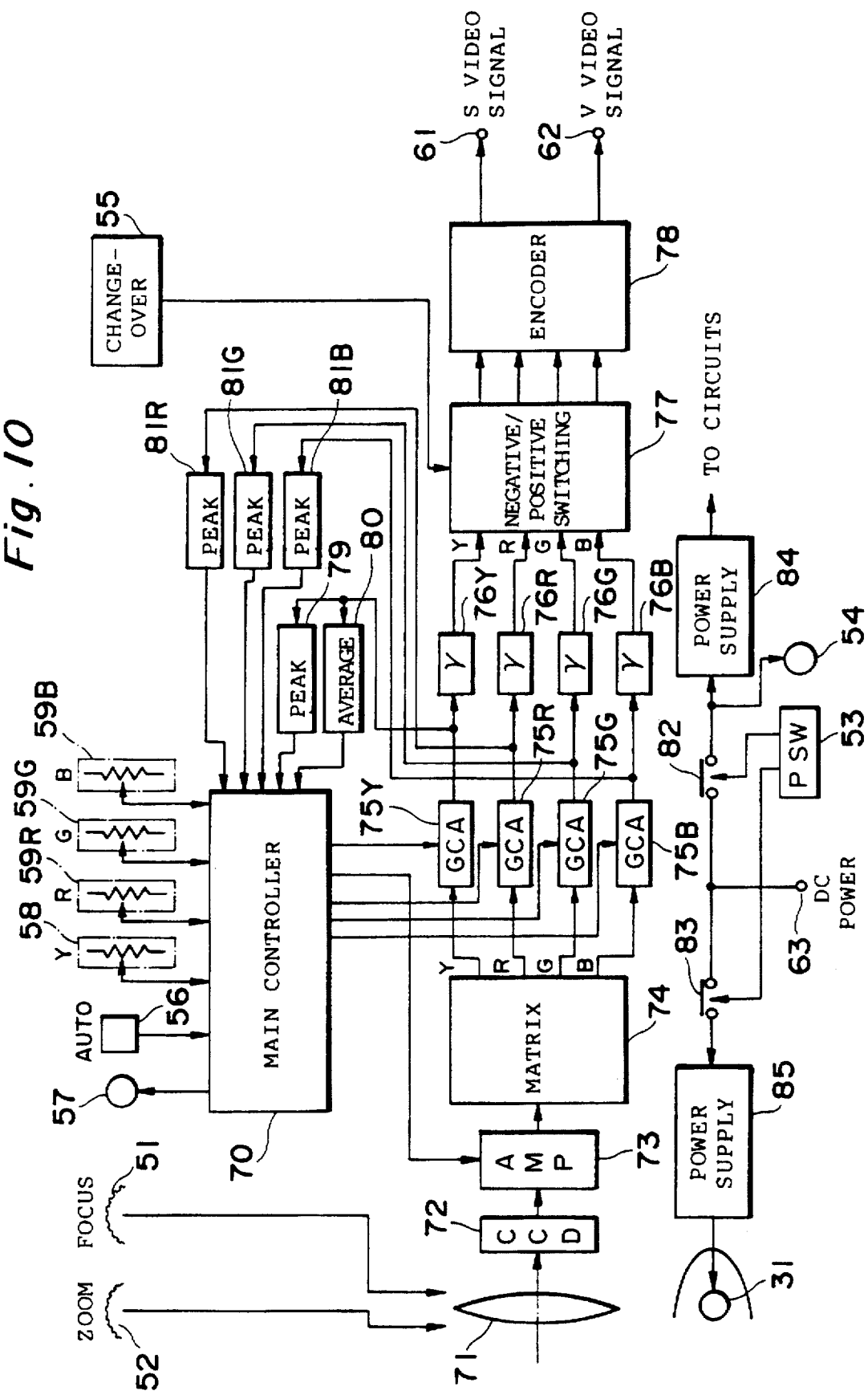
FIG. 10 is a block diagram showing the electrical configuration of the electronic viewer.

FIG. 10 shows the configuration of an optical system and electric circuitry which are contained in the viewer main body 11.

The imaging optical system 71 comprises a zoom lens. The position of the zoom lens is adjusted by manually operating the zoom dial 52, whereby the magnification of a subject to be imaged is arbitrarily set. Focusing in the imaging optical system 71 is adjusted by manually operating the focusing dial 51.

A light image of the subject is formed on a CCD 72 through the imaging optical system 71. The CCD 72 is so driven as to output an image signal representing the image of the subject in a period of 1/60 seconds, similarly to a movie video camera.

The image signal outputted from the CCD 72 is amplified by a preamplifier 73 and then, is applied to a matrix circuit 74. In the matrix circuit 74, the image signal is converted into a luminance signal Y and signals of the three primary colors R, G and B.

The signals Y, R, G and B are further amplified by gain controlled amplifiers (hereinafter referred to as GCAs) 75Y, 75R, 75G and 75B, respectively, and are inputted to gamma correction circuits 76Y, 76R, 76G and 76B. The luminance signal Y and the color signals R, G and B which are subjected to gamma correction in the circuits are then applied to a negative/positive switching circuit 77.

Control such as brightness adjustment or color adjustment in the electronic viewer is carried out by a main control device 70. The main control device 70 is preferably constituted by a CPU, a memory and other peripheral circuits (including an interface).

The luminance signal Y outputted from the GCA 75Y is also applied to a peak detecting circuit 79 and an average detecting circuit 80. In the circuits, the peak value and the average value of the luminance signal Y are detected, and the results of the detection are inputted to the main control device 70. The peak values of the color signals R, G and B are also detected by peak detecting circuits 81R, 81G and 81B, and the results of the detection are applied to the main control device 70. The peak detection and the average detection are repeated every 1/60 seconds.

When the tone-of-color/brightness automatic control button 56 is depressed, the gains of the preamplifiers 73 and the GCAs 75Y, 75R, 75G and 75B are adjusted by the main control device 70 so that a reproduced image has suitable brightness and tone of color on the basis of the results of the peak detection and the results of the average detection which are inputted. In addition, the tone-of-color/brightness automatic control indicator lamp 57 lights up.

When the automatic control button 56 is not depressed, it is possible to manually adjust the brightness and the tone of color, respectively, using the brightness adjustment dial 58 and the tone-of-color adjustment dials 59R, 59G and 59B.

The main control device 70 controls the gain of the preamplifier 73 and/or the gain of the GCA 75Y in response to an input signal from the dial 58. The main control device 70 also controls the gains of the GCAs 75R, 75G and 75B, respectively, in response to input signals from the dials 59R, 59G and 59B.

The changeover switch 55 is a slide switch, and has three positions or modes, that is, "negative black-and-white", "negative" and "positive". Any one of the modes is selected. The negative/positive switching circuit 77 performs signal processing conforming to the mode selected by the changeover switch 55. When the subject is a negative black-and-white film, the "negative black-and-white mode is selected. Accordingly, only the luminance signal Y is selected in the switching circuit 77 so as to display a gray image, and the selected luminance signal Y is applied to an encoder 78. When the subject is a negative film, the "negative" mode is selected. Accordingly, negative-to-positive inversion processing of the input signals Y, R, G and B is performed in the negative/positive switching circuit 77.

Signals outputted from the negative/positive switching circuit 77 are applied to the encoder 78. In the encoder 78, the signals are converted into video signals in a form suited to be applied to the display device, that is, an S video signal and a V video signal. Thereafter, the S and V video signals are respectively introduced into S and V output terminals 61 and 62.

A commercial AC power supply is converted into a DC power supply having a suitable voltage through an AC adaptor (not shown), and the DC power supply is applied to a DC input terminal 63.

The DC power supply applied to the DC input terminal 63 is applied to the power supply circuits 84 and 85 through power supply switches 82 and 83. The power supply circuit 84 is for supplying operating power to each of the above described circuits. The power supply circuit 85 supplies power to the lighting lamp 31 through the above described code 27.

The power supply switch 53 is a slide switch having three positions, that is, "power-on", "power-off" and "lighting lamp". When the power supply switch 53 is in the "power-off" position, both the switches 82 and 83 are off. When the power supply switch 53 is in the "power-on" position, the switch 82 is turned on. Consequently, a DC input is applied to the power supply circuit 84, and the power supply indicator lamp 54 lights up. When the power supply switch 53 is in the lighting lamp" position, both the switches 82 and 83 are turned on. The switches 82 and 83 may be subjected to on-off control by the main control device 70 depending on the position of the power supply switch 53.

Figure 11:
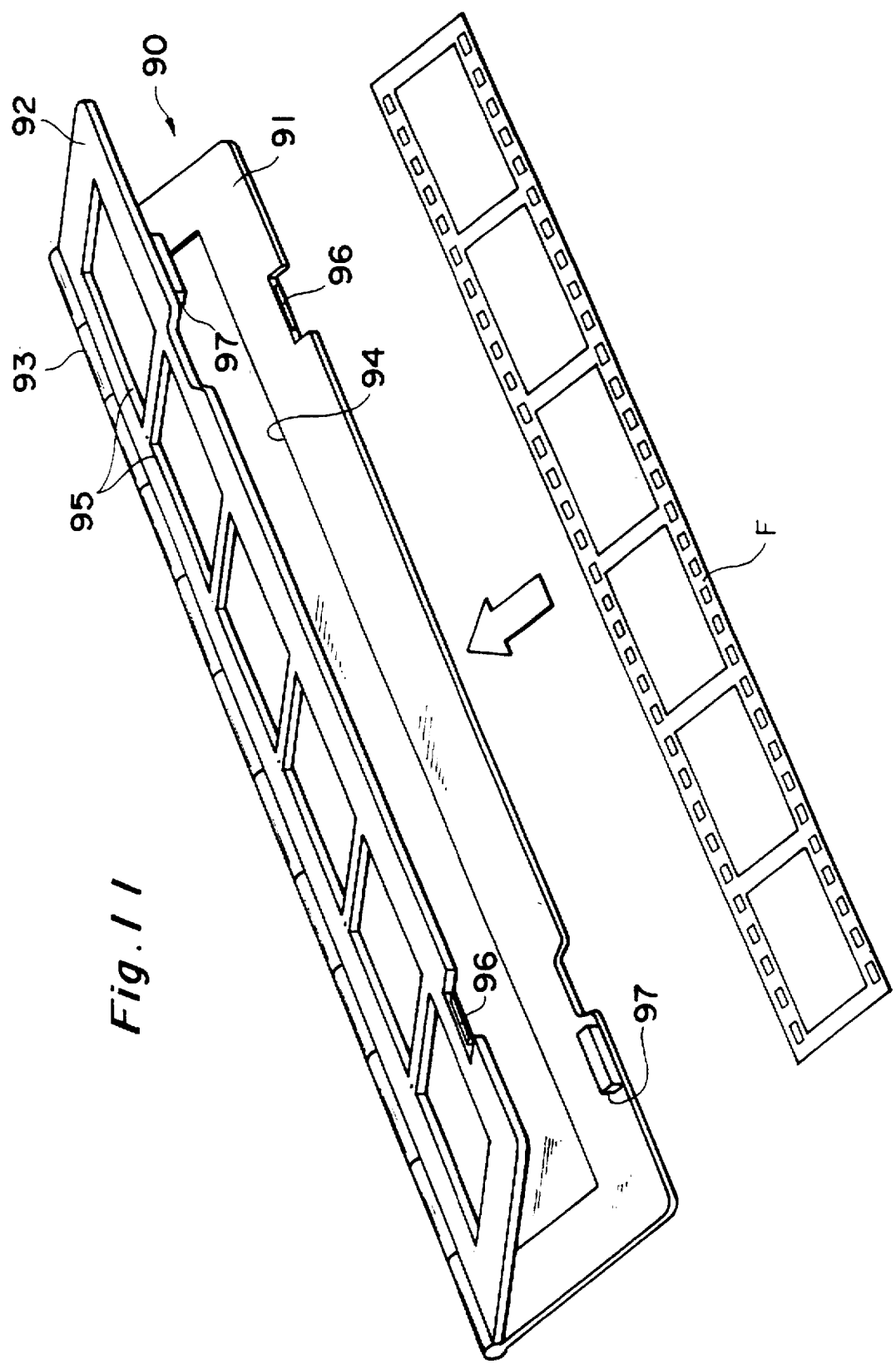
FIG. 11 is a perspective view showing a negative carrier.
Figure 12:
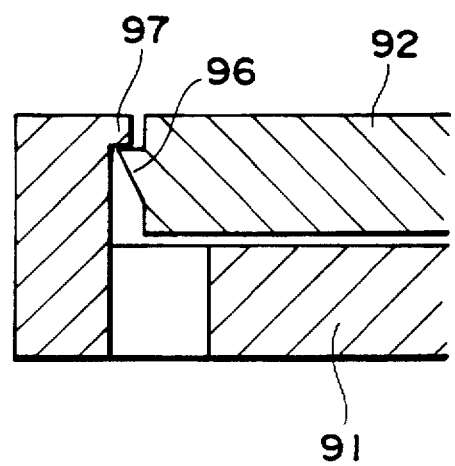
FIG. 12 is an enlarged sectional view showing a locking mechanism of the negative carrier.

FIG. 11 and 12 illustrate one example of a negative carrier. A negative carrier 90 is constructed by connecting two plates 91 and 92 to each other on one side by a hinge 93 so as to be capable of being opened and closed.

One of the plates 91 is opalescent and functions as a diffusing plate (a light scattering plate). A shallow recess 94 for accommodating a negative film F is formed on the inner surface of the plate 91. Windows 95 which frames on the negative film F accommodated in the recess 94 respectively face are formed in the other plate 92.

Fingers 96 and steps 97 are formed in respective two places of both the plates 91 and 92 with the finger 96 and the step 97 being opposite to each other. When the negative film F is accommodated in the recess 94 in a state where both the plates 91 and 92 are opened and then both the plates 91 and 92 are closed, the fingers 96 are respectively engaged with the steps 97 so that both the plates 91 and 92 are kept in a closed state.

Figure 13:
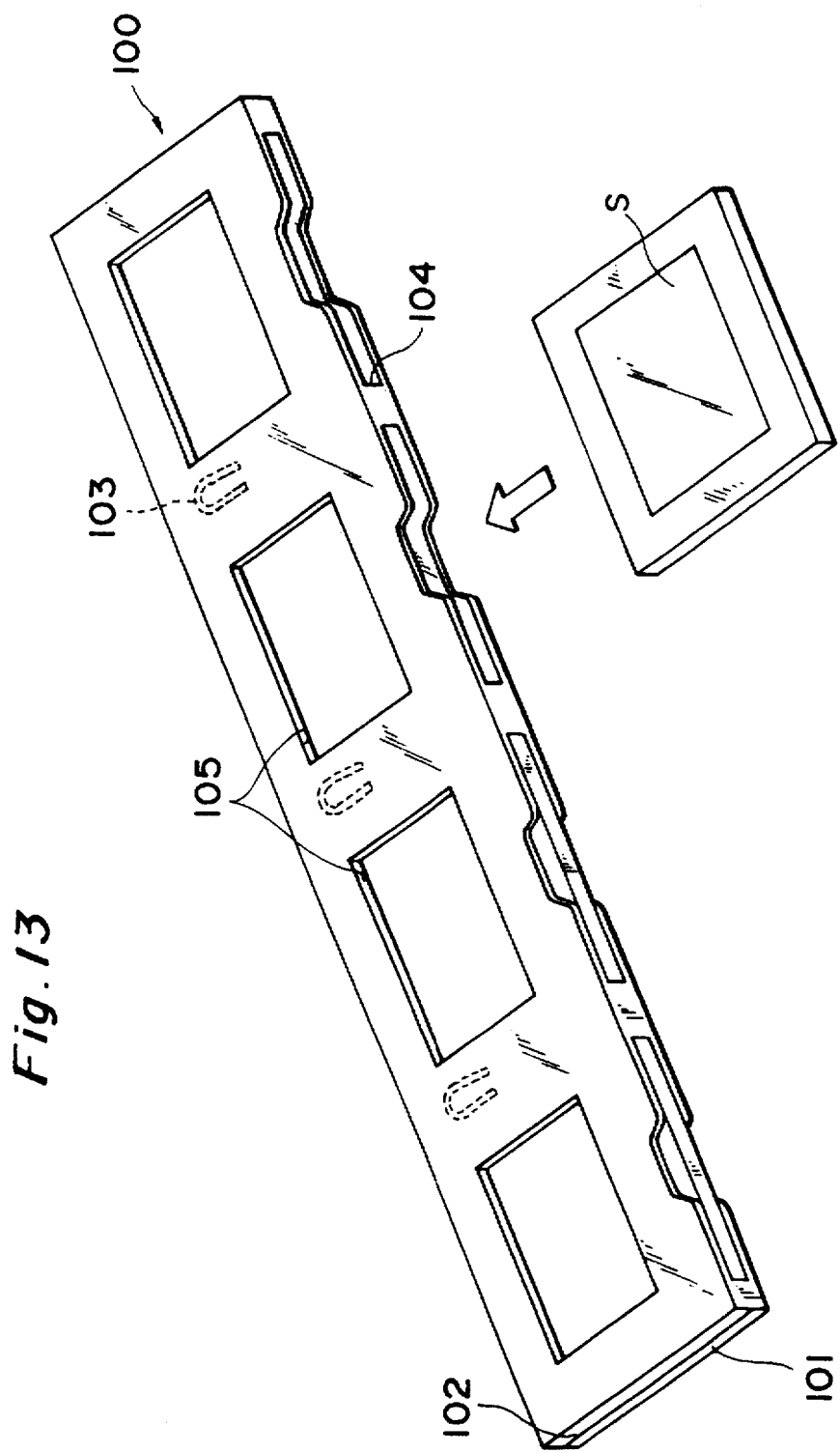
FIG. 13 is a perspective view showing a slide carrier.

FIG. 13 illustrates one example of a slide carrier. A slide carrier 100 also comprises two plates 101 and 102, and the plates are bonded by ultrasonic welding or the like at their appropriate positions.

The one plate 101 is also a diffusing plate (a light scattering plate). Windows 105 which a frame of a slide S accommodated in the slide carrier 100 faces are formed in the other plate 102. Inlets 104 into which the slide S is to be inserted are provided on one side of the slide carrier 100. A space for accommodating the slide S is formed inward from the inlet 104. Springs 103 for pressing the slide S inserted into the space down from the side are provided in the slide carrier 100.

Description is made of a method of using the electronic viewer of the above described construction, and the negative carrier 90 and the slide carrier 100.

Figure 14:
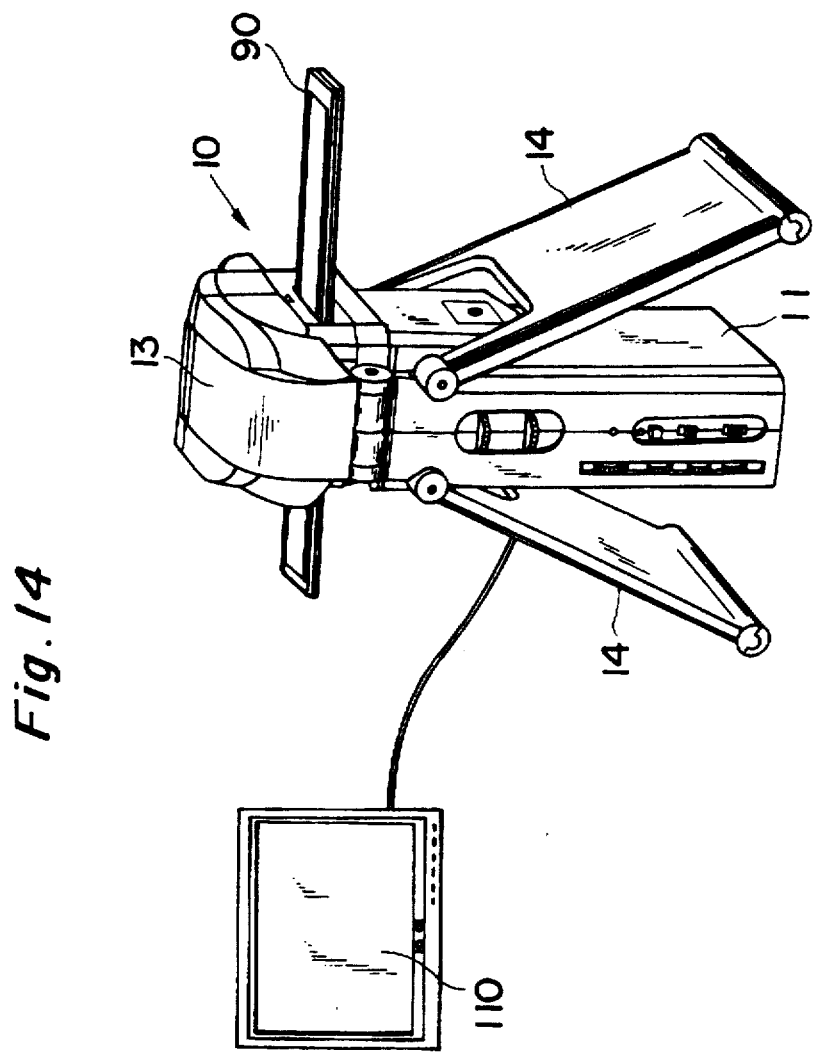
FIG. 14 is a perspective view showing a first manner in which the electronic viewer is used.

FIG. 14 shows a first manner of use, which is for seeing a negative image on a negative film accommodated in the negative carrier 90 as a positive image.

The supporting arms 14 are opened to the first stable position, to raise the electronic viewer 10 and support the same by the supporting arms 14. The lower end of the viewer main body 11 of the electronic viewer 10 and the lower ends of the supporting arms 14 are lined up at the same height, that is, on one horizontal plane.

The negative carrier 90 accommodating a negative film is inserted into the carrier inlet 21. The head covers 13 are kept in a closed state. The lighting lamp 31 is lighted by the power supply switch 53. The negative mode is selected by the changeover switch 55.

Consequently, an image of a frame positioned ahead of the imaging optical system 71 on the negative film in the negative carrier 90 is displayed as a positive image on the display screen of a display device 110 connected to the electronic viewer 10.

It goes without saying that the positive mode is selected by the changeover switch 55 in the case of a positive film. Further, it goes without saying that the slide carrier 100 accommodating a slide is inserted, in place of the negative carrier 90, into the carrier inlet 21 so that an image on the slide can be displayed on the display device 110.

It is also possible to record a video signal outputted from the electronic viewer 10 on a magnetic tape by a video recorder. Further, if a computer system has a-video signal input terminal, it is also possible to apply the video signal outputted from the electronic viewer 10 to the computer system.

Figure 15:
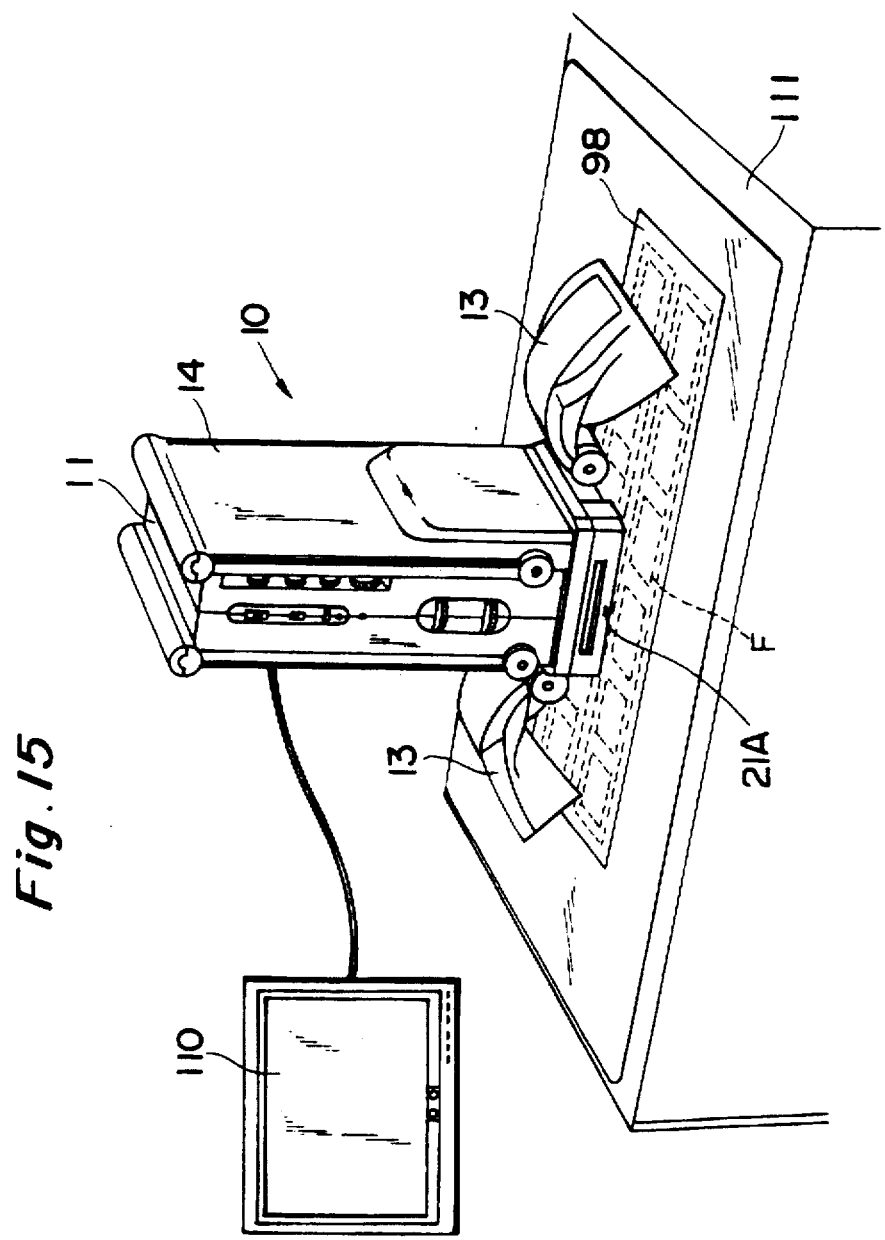
FIG. 15 is a perspective view showing a second manner in which the electronic viewer is used.

FIG. 15 shows a second manner of use, which is for seeing an image on a negative (or positive) film F accommodated in a sheath as a positive image with it being accommodated in the sheath.

A light box 111 has a lighting lamp in its inner part, and has a diffusing plate provided on its upper surface. A sheath 98 accommodating the film F is placed on the diffusing plate on the light box 111.

The electronic viewer 10 is inverted on the sheath 98 in a state where the carrier holder 12 of the electronic viewer 10 is rotated through 90° and the head covers 13 are fully opened. The opened head covers 13 perform a function of preventing the electronic viewer 10 from falling down or rolling sideways. The lighting lamp 31 need not light up. Consequently, the film F in the sheath 98 is imaged, and an image of the film F is displayed on the display device 110. It is possible to see an arbitrary frame of the film F by moving the electronic viewer 10 on the sheath 98. At this time, if the center of the frame of the film F coincides with the mark 21A, the entire frame of the film F can be imaged.

Since the width (thickness) of the viewer main body 11 between the side surfaces provided with the supporting arms 14 is smaller than that between the side surfaces orthogonal thereto, the head covers 13 can be fully opened if the carrier holder 12 is rotated through 90° as shown in FIG. 3.

Figure 16:
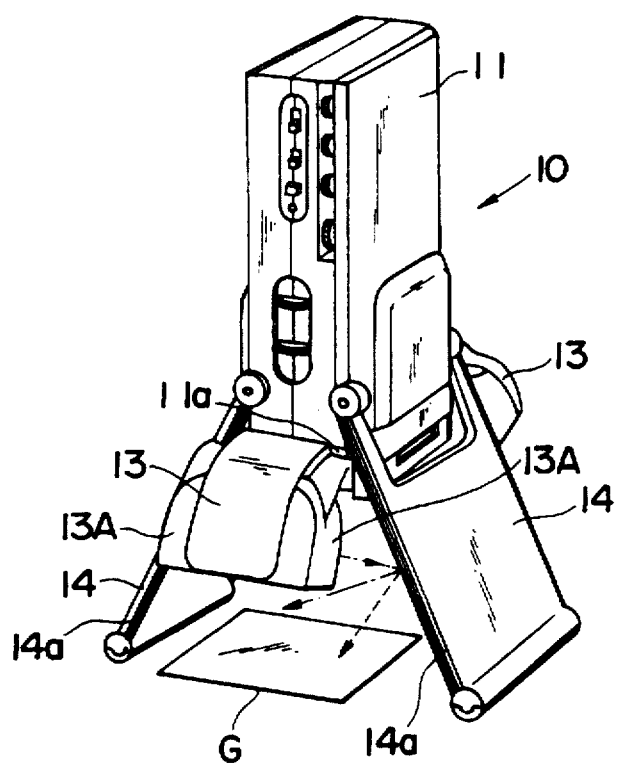
FIG. 16 is a perspective view showing a third manner in which the electronic viewer is used.

FIG. 16 shows a third manner of use, which is for seeing a picture, a document or the like.

The head covers 13 are opened to such an angle as to abut against the slanting planes 11a of the viewer main body 11, and the supporting arms 14 are opened to the second stable position. The electronic viewer 10 is inverted and is supported by the supporting arms 14. A document, a picture G or the like to be seen is placed in a position directly below the electronic viewer 10. The lighting lamp 31 is lighted as required. The document, the picture G or the like is illuminated by the lighting lamp 31. It goes without saying that an image obtained by imaging using the electronic viewer 10 is displayed on a display device, which is not illustrated. It is possible to also record a video signal as required.

Since wing portions 13A slightly projected are formed on both sides of the head cover 13, the wing portion 13A blocks up a clearance between the supporting arm 14 and the head cover 13 to some extent. Consequently, light from the outside such as a ceiling lamp is prevented from being incident on the document G to some extent, thereby to make it possible to obtain a sharp image having no disturbance.

Figure 17:
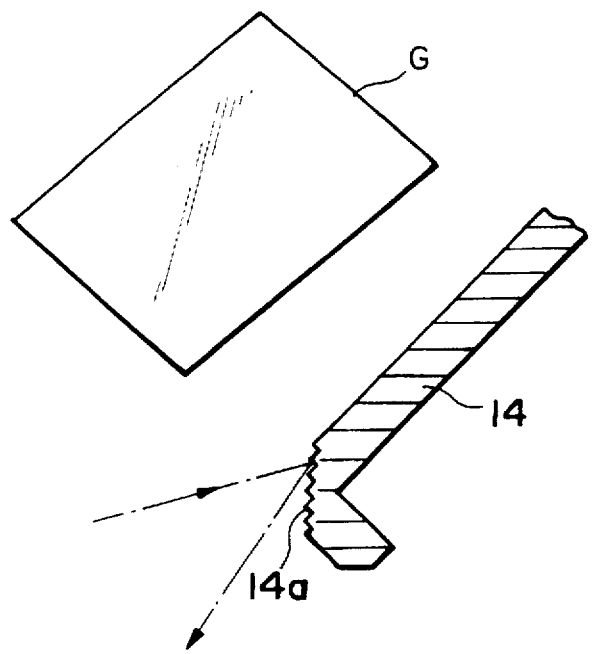
FIG. 17 illustrates the function of a step portion of a supporting arm.
Figure 18:
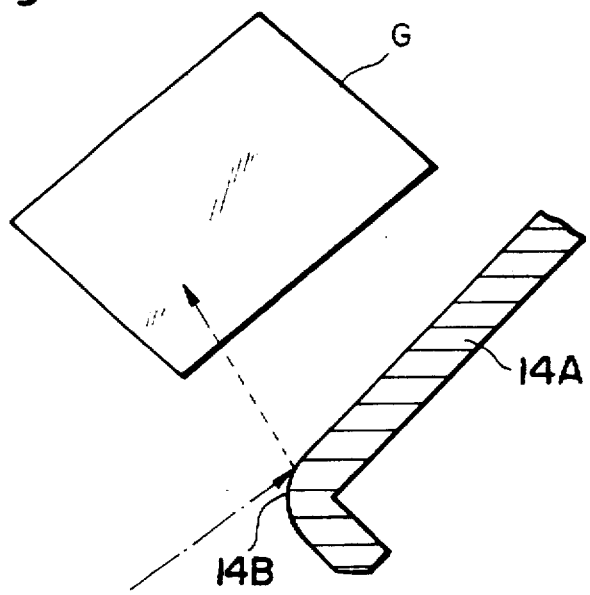
FIG. 18 illustrates problems in a supporting arm having a rounded corner.

A corner of the supporting arm 14 is exposed to a part of light from the lighting lamp 31. Since the step-shaped portion 14a is formed in this corner, however, the light from the lighting lamp 31 is reflected from the step-shaped portion 14a, to be directed not toward the document G but outward, as shown in FIG. 17. If the corner of the supporting arm 14A is rounded as shown in FIG. 18 (indicated by reference numeral 14B), a part of the light from the lighting lamp 31 is reflected from this portion 14B, to be directed toward the document G as indicated by a broken line. Accordingly, an image of the supporting arm 14A appears on the document G, so that such a disturbed image is unfavorably obtained by imaging. Such a problem is solved by the presence of the step-shaped portion 14a.

Figure 19:
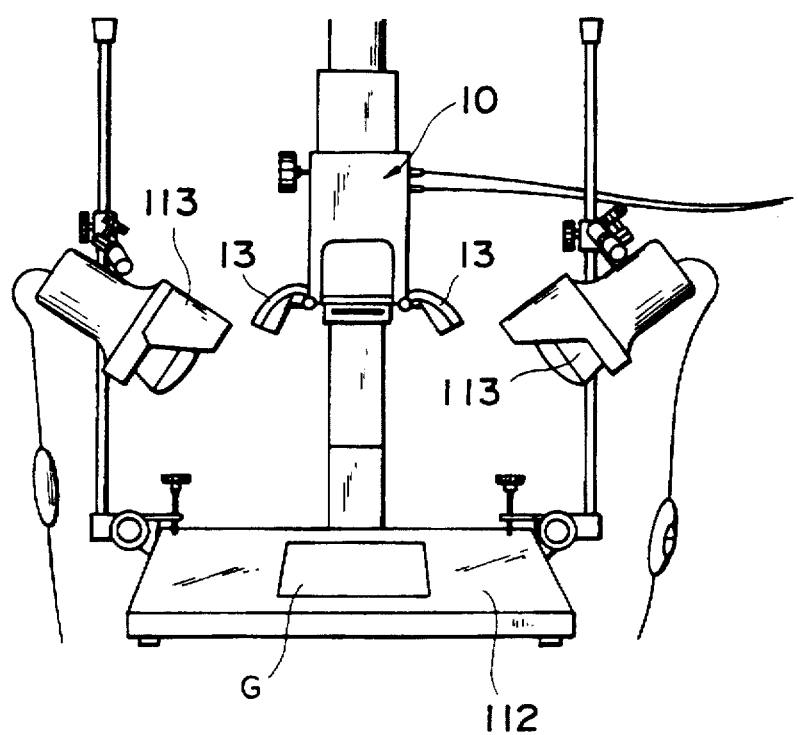
FIG. 19 is a perspective view showing a fourth manner in which the electronic viewer is used.

FIG. 19 shows a fourth manner of use, which is for seeing or displaying a large-sized document or the like.

The electronic viewer 10 is fixed downward to a support of a stand 112. The head covers 13 are opened fully or to a suitable angle. The supporting arms 14 are kept in a closed state. Lighting lamps 113 are disposed around the stand 112 as required. The lighting lamp 31 of the electronic viewer 10 need not light up. A document G is placed on a substrate of the stand 112.

This manner of use is particularly applicable to the above described electronic projector. If a video signal outputted from the electronic viewer 10 is particularly applied to a large-sized display device, a document G is displayed thereon in an enlarged manner.

Figure 20:
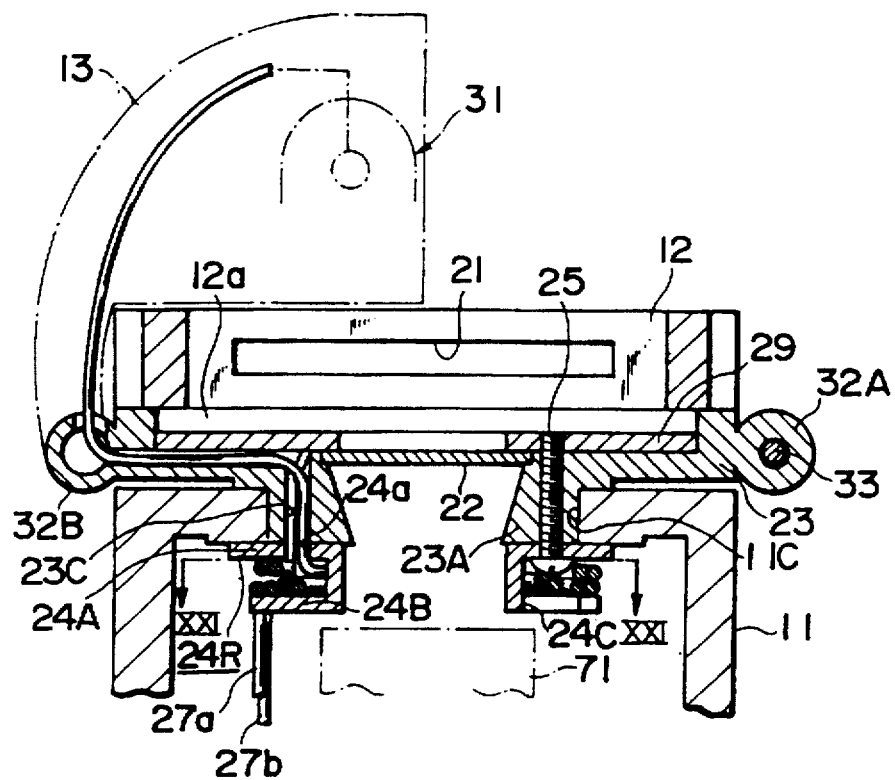
FIG. 20 to 22 illustrate a first modified example, where
Figure 21:
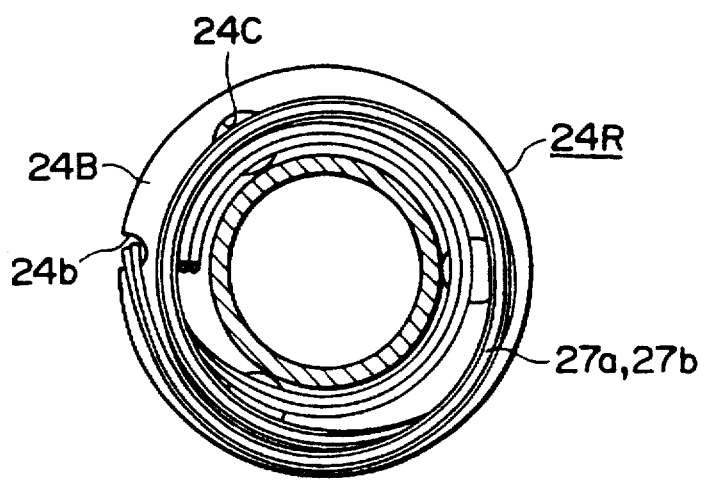
Figure 22:
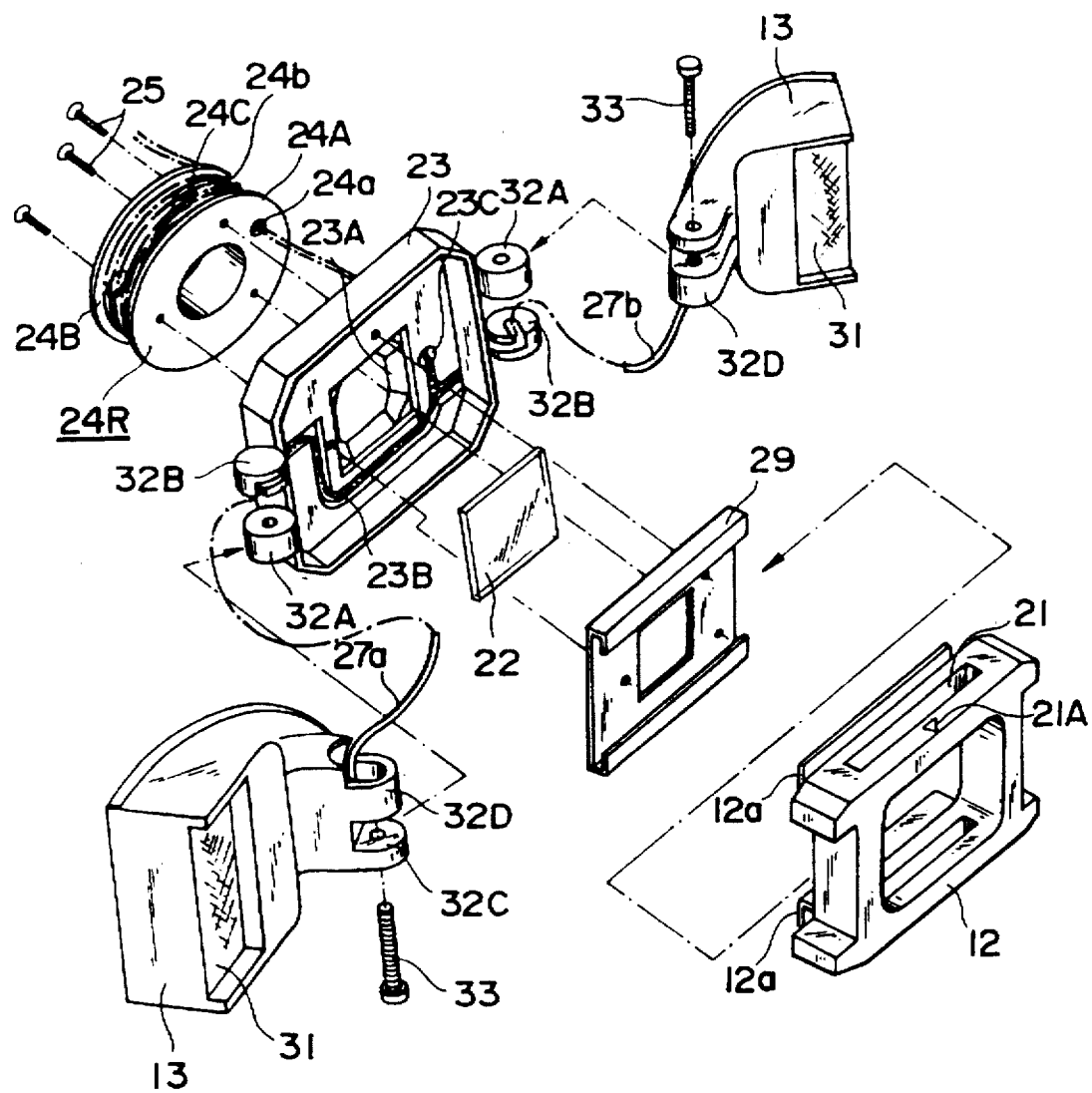

FIGS. 20 to 22 illustrate a first modified example. This modified example relates to wiring of an electrical code for introducing current into a lighting lamp 31. In the figures, the same portions as those already described are assigned the same reference numerals and hence, the overlapping description is avoided.

A code reel 24R is mounted, in place of an end plate 24, on the lower surface of an annular projected ring portion 23A of a carrier holder 12. The code reel 24R holds parts of codes (electric wires) 27a and 27b for supplying current from a power supply circuit 85 to a lighting lamp 31 provided for head covers 13 so as to allow the carrier holder 12 to be rotated through 90°. The code reel 24R is constituted by an upper flange 24A, a lower flange 24B, and a short cylindrical portion for coupling the flanges.

A peripheral edge of a circular opening 11C formed in an upper end surface of a viewer main body 11 is interposed between a base 23 and the upper flange 24A of the code reel 24R, and a guide 29, the base 23 and the upper flange 24A are fastened at three positions by set screws 25. Since the peripheral edge of the circular opening is interposed between the base 23 and the upper flange 24A relatively loosely, the carrier holder 12 (and the base 23) are rotatable relative to the viewer main body 11. A positioning mechanism (not shown) is so provided that the carrier holder 12 stably rests in two positions (the position shown in FIG. 1 and the position shown in FIG. 3) spaced at an angle of 90°. The positioning mechanism will be constituted by, for example, grooves or notches formed at two positions spaced at an angle of 90° on the lower surface or the peripheral surface of the upper flange 24A and a click spring attached to the viewer main body 11 and entering the grooves or notches. In addition, a stopper (not shown) for preventing the carrier holder 12 from being rotated through not less than 90° is provided at a suitable portion of the viewer main body 11. The lower flange 24B of the code reel 24 is provided with holes 24C through which the set screws 25 are to be inserted.

A cylindrical portion 32B which is not related to a hinge function is provided with a groove opening to a cylindrical portion 32D and leading to a recess of the base 23 through the cylindrical portion 32B. A groove 23B is formed on the inner surface of the base 23. The groove 23B connects with a hole 23C formed in the annular projected ring portion 23A. In addition, a hole 24a is also formed in the upper flange 24A of the code reel 24R in a place corresponding to the hole 23C. The codes 27a and 27b drawn out of the power supply circuit 85 enter the code reel 24R from a notch 24b formed in the lower flange 24B of the code reel 24R and are wound around the code reel 24R loosely one to several times (preferably wound at least once), respectively leading to the head covers 13 through the hole 24a of the upper flange 24A, the hole 23C of the base 23, the groove 23B on the bottom surface of the base 23, the groove of the cylindrical portion 32B, and the inside of the cylindrical portion 32D. The codes 27a and 27b are connected to the lighting lamps 31. Since the codes 27a and 27b are wound around the reel 24R loosely, the length of the codes 27a and 27b has an allowance of not less than one-fourth of the circumference (90°) of the reel 24R. Even if the carrier holder 12 is rotated within the range of an angle of 90°, therefore, the codes 27a and 27b allow this rotation. Since the codes 27a and 27b are wound around the reel 24R, they do not get out of the way in the viewer main body 11 even if the length thereof is large, not to get entangled in or interfere with other members and the like.

FIG. 23 to 26 show a second modified example. This modified example relates to a structure in which higher stability can be ensured in a state where the electronic viewer is used.

Figure 23:
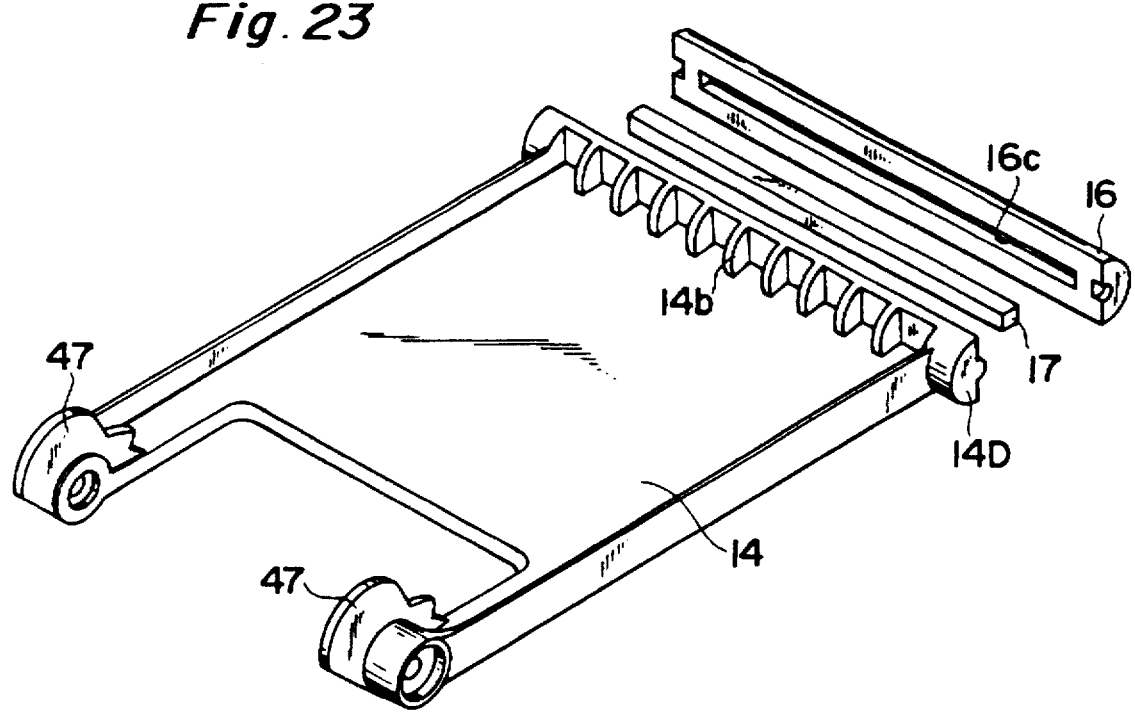
FIG. 23 to 26 illustrate a second modified example, where
Figure 24:
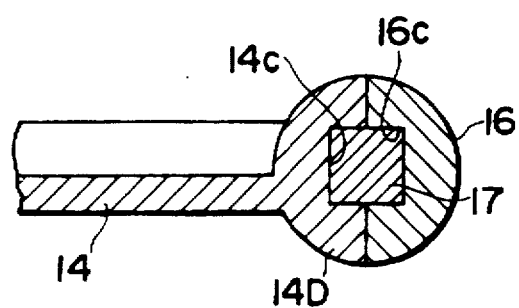

FIG. 23 and 24 illustrate a structure of a base end (lower end) of a supporting arm 14. A cylindrical portion extending in the transverse direction is formed in the base end of the supporting arm 14. The cylindrical portion is constituted by a semicylindrical portion 14D formed integrally with a main body portion of the supporting arm 14 and a semicylindrical portion 16 made of rubber attached thereto. The main body portion of the supporting arm 14 and the semicylindrical portion 14D are generally made of synthetic resin. A plurality of ribs 14b are formed in the semicylindrical portion 14D so as to enhance a decorative effect. The semicylindrical portion 16 made of rubber functions as a non-slip surface.

A joint surface of the semicylindrical portions 14D and 16 are provided with concave grooves 14c and 16c extending in its longitudinal direction. A weight 17 made of a heavy metal such as lead is accommodated in the concave grooves 14c and 16c, and the semicylindrical portions 14D and 16 are bonded with adhesives on the joint surface. Consequently, the center of gravity of the whole electronic viewer is lowered in a manner of use of the electronic viewer in which the base end of the supporting arm 14 is in the lower position, thereby to stabilize the posture of the electronic viewer.

Figure 25:
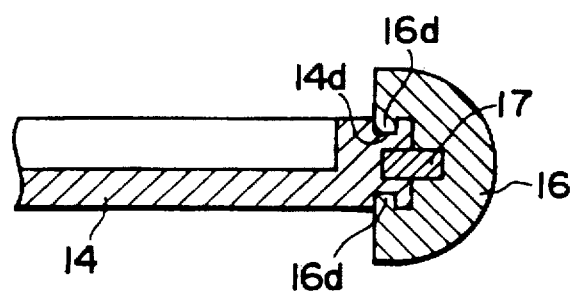

FIG. 25 illustrates an example of another structure. Grooves 14d are formed on both surfaces of the base end of a supporting arm 14. On the other hand, claws 16d engaged with the grooves 14d are formed in a semicylindrical portion 16 made of rubber. A weight 17 is embedded in the base end of the supporting arm 14 and the semicylindrical portion 16 made of rubber. In this example, the semicylindrical portion 16 serving as a non-slip is mounted on the supporting arm 14 without using adhesives.

Figure 26:
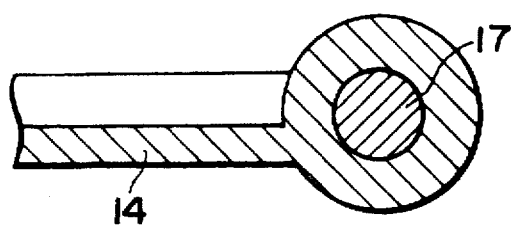

FIG. 26 illustrates an example of still another structure. A weight 17 is formed in a base end of a supporting arm 14 by insert molding. Specifically, the weight 17 is embedded in the base end when the supporting arm is formed of resin.

In the first manner of use shown in FIG. 14, the electronic viewer 10 stably stands because the weight 17 is provided in the base end of the supporting arm 14 so that the center of gravity is lowered. Even if a user touches a code for connecting the electronic viewer 10 and the display device 110, the electronic viewer 10 does not easily upset. Further, even when a negative carrier or a slide carrier is inserted into the inlets 21, the electronic viewer 10 is stable and is easy to operate.

Also in the third manner of use shown in FIG. 16, the inverted electronic viewer 10 is stabilized because the weight 17 of the supporting arm 14 is in the lowermost position.

Since the non-slip is provided in the base end of the supporting arm, the stability of the electronic viewer is further enhanced. The non-slip surface may be formed not only by making the base end of rubber but also by providing the base end with an irregularity, recesses (grooves), projections (projected stripes) or the like.

FIG. 27 to 30b illustrate a third modified example. This modified example is directed to suitably switching the amount of light of a lighting lamp for illuminating a film or a document depending on the manner of use.

Figure 27:
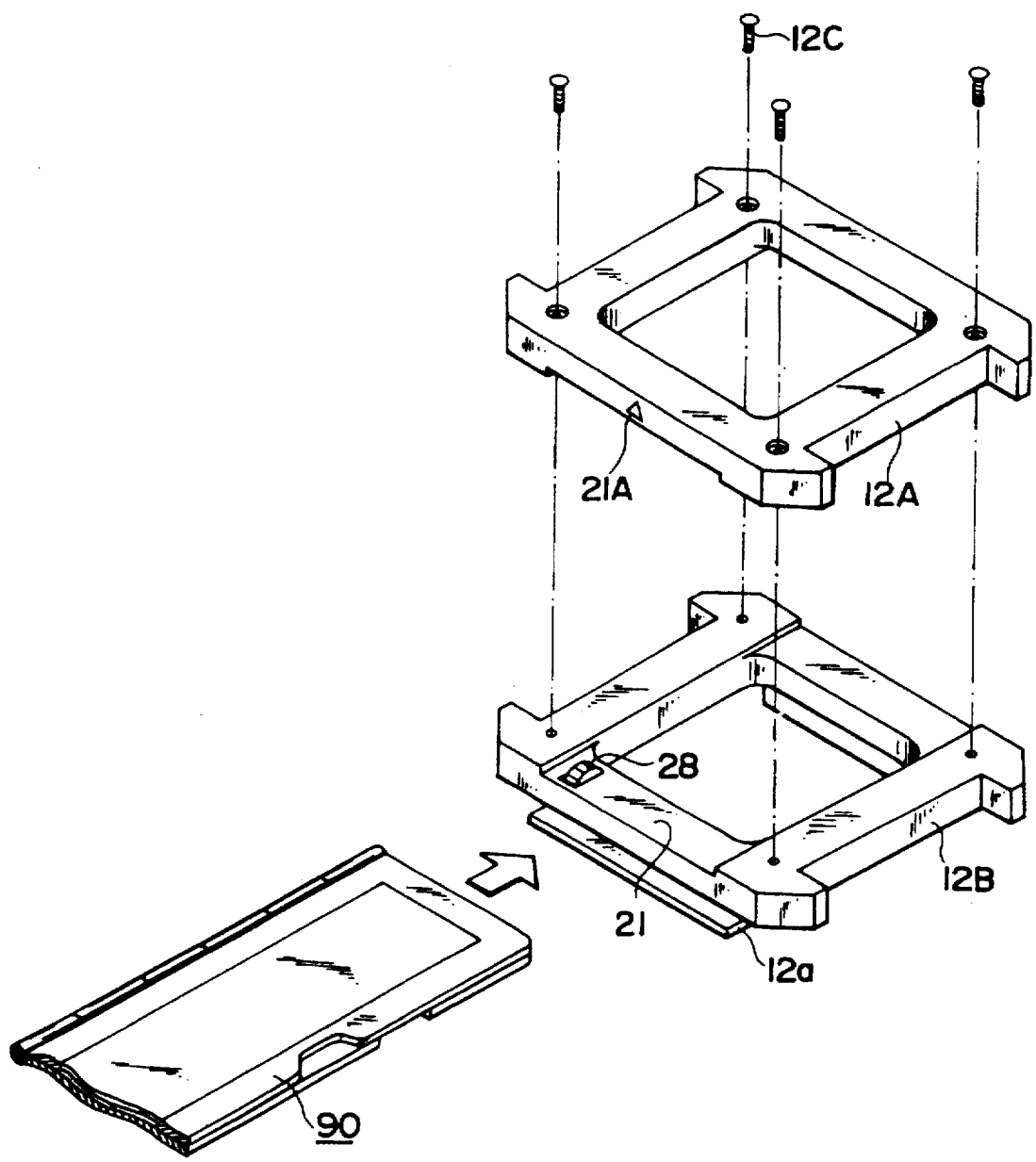

FIG. 27 shows a carrier holder 12 in an enlarged manner. The carrier holder 12 is constituted by two half bodies 12A and 12B, and the half bodies 12A and 12B are fastened by screws 12C. A carrier detecting switch 28 is provided on a wall surface of a carrier inlet 21 formed in the carrier holder 12. The carrier detecting switch 28 is depressed by a negative carrier (a film carrier) 90 (or a slide carrier 100) inserted into the carrier inlet 21, to output a carrier detection signal. A code (not shown) for transmitting the carrier detection signal is introduced into a viewer main body 11 through a long hole (not shown) formed in a guide 29 and a groove 23B of a base 23.

Figure 28:
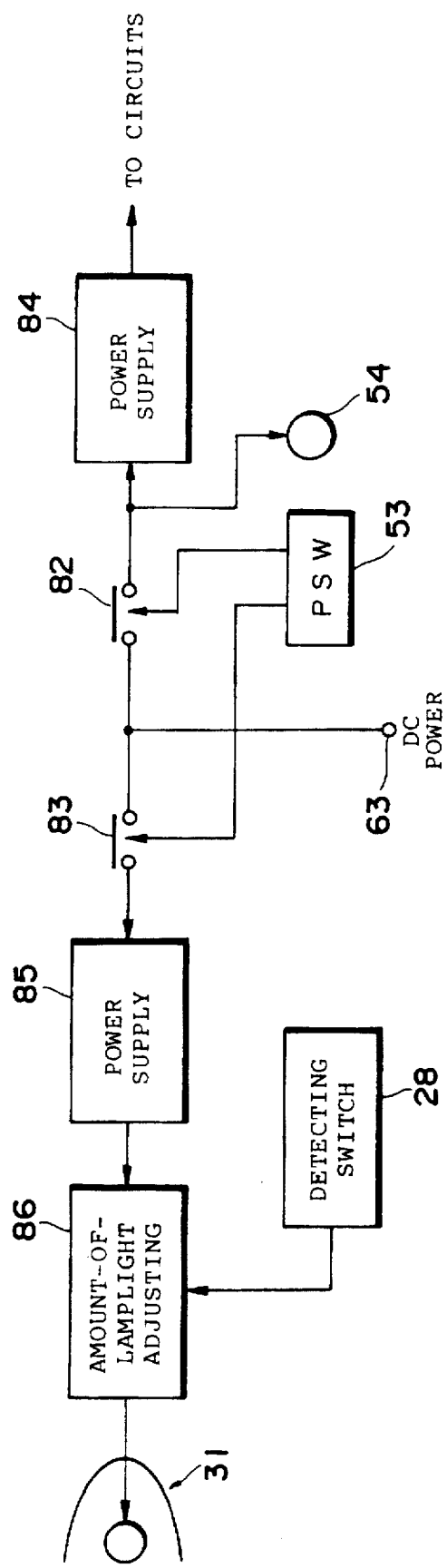

FIG. 28 illustrates only portions relating to a power supply circuit in the electric circuitry (FIG. 10) contained in the viewer main body 11. Current is supplied to a lighting lamp 31 from a power supply circuit 85 through an amount-of-lamplight adjusting device 86 (and a code 27).

The amount-of-lamplight adjusting device 86 adjusts the amount of light of the lighting lamp 31 in response to a signal from a carrier detecting switch 28. Specifically, the current (or voltage) supplied to the lighting lamp 31 is so controlled that the amount of light of the lighting lamp 31 in a case where the detecting switch 28 detects the negative carrier 90 becomes approximately one-half to one-third that in a case where the detecting switch 28 does not detect the negative carrier 90.

Figure 29:
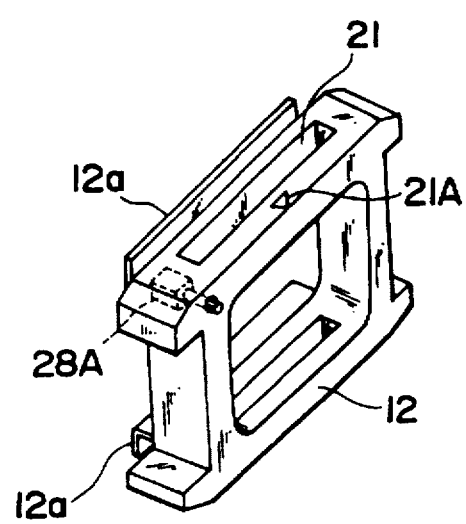

FIG. 29 illustrates another example of a sensor for adjusting the amount of light of the lighting lamp 31. An opening and closing sensing switch 28A of head covers 13 is provided inside a carrier holder 12. A plunger of the sensing switch 28A is projected from the upper surface of the carrier holder 12. If the head covers 13 are closed, the plunger is depressed by the head covers 13. Consequently, a closing sensing signal of the head covers 13 is generated from the sensing switch 28A. This sensing signal is applied, in place of the carrier detection signal from the carrier detecting switch 28, to the amount-of-lamplight adjusting circuit 86. The amount-of-light adjusting circuit 86 decreases the amount of light of the lighting lamp 31 in a case where the closing detection signal of the head cover 13 is inputted to approximately one-half to one-third that in a case where this signal is not inputted.

FIG. 30a and 30b illustrate another example of mounting of the head cover opening and closing sensing switch. In the portion of a hinge 32 of each of head covers 13, a cam plate 13A having a notch in its part is mounted on the head cover 13. The cam plate 13A rotates together with the head cover 13 around the center of the hinge 32. A head cover opening and closing sensing switch 28B is attached to the suitable position of a base 23. A lever of the sensing switch 28B abuts against a peripheral surface of the cam plate 13A. The notch of the cam plate 13A is formed in such a position that a closing sensing signal is outputted from the sensing switch 28B when the head cover 13 is closed, while being stopped when the head cover 13 is opened. The closing sensing signal from the sensing switch 28B is applied, in place of the closing sensing signal from the sensing switch 28A, to an amount-of-lamplight adjusting circuit 86.

In the first manner of use shown in FIG. 14, the negative carrier 90 is inserted into the carrier inlet 21, whereby the inserted negative carrier 90 is detected by the carrier detecting switch 28. The head covers 13 are closed, whereby the closing of the head covers 13 is detected by the head cover opening or closing sensing switch 28A or 28B. Consequently, the amount of light of the lighting lamp 31 is decreased by the amount-of-lamplight adjusting circuit 86 in response to one of the carrier detection signal from the switch 28 or the closing sensing signal from the switch 28A or 28B. The lighting lamp 31 is provided inside the head covers 13. The lighting lamp 31 is in a position close to a film inside the negative carrier 90 in a state where the head covers 13 are closed. Since the amount of light of the lighting lamp 31 is decreased, the film is illuminated under suitable brightness.

It goes without saying that the positive mode is selected by a changeover switch 55 in the case of a positive film. Further, it goes without saying that an image on a slide accommodated in the slide carrier 100 can be displayed on the display device 110 by inserting the slide carrier 100 into the carrier inlet 21. Also in the case, the amount of light of the lighting lamp 31 is decreased.

In the third manner of use shown in FIG. 16, no negative carrier or slide carrier is inserted into the carrier inlet 21 of the carrier holder 12, whereby a carrier detection signal is not outputted from the carrier detecting switch 28. The head covers 13 are opened, so that the closing sensing signal of the head covers 13 is not outputted from the head cover opening and closing sensing switch 28A or 28B. Consequently, the amount of light of the lighting lamp 31 is kept large by the amount-of-lamplight adjusting circuit 86. The position of the lighting lamp 31 provided for the head covers 13 is relatively far away from a document G or the like (as compared with the first manner of use shown in FIG. 14). Since the amount of light emitted from the lighting lamp 31 is large, a document in a relatively far position is illuminated brightly.

The amount of light of the lighting lamp is thus so switched as to be decreased if a subject (a film) is close to the lighting lamp (the first manner of use), while being increased if a subject (a document or the like) is far away from the lighting lamp (the third manner of use). Accordingly, the subject is always illuminated under suitable brightness, thereby to make it possible to reproduce (display or record) an image of the subject properly illuminated. The manner of use is detected even if a user does not operate a special operation, and the amount of light is automatically switched on the basis of the detection signal. If the subject is close to the lighting lamp, the amount of light of the lighting lamp is decreased, thereby to make it possible to save energy as well as to prevent unnecessary heat from being generated. It goes without saying that the ratio of a low amount of light to a high amount of light may be properly determined in consideration of factors such as the distance to a subject in each manner of use.

FIGS. 31 to 39 illustrate a fourth modified example. The fourth modified example makes it possible to use an electronic viewer simply and easily.

Figure 31:
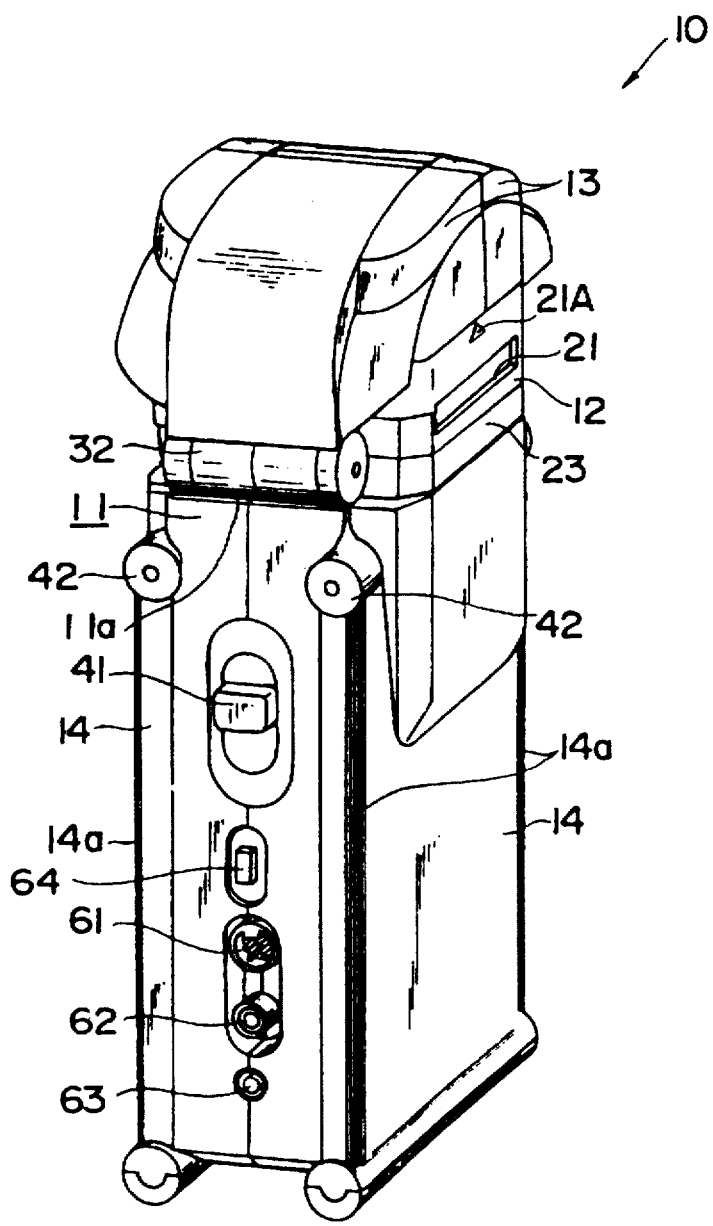
FIGS. 31 to 39 illustrate a fourth modified example, where

Referring to FIG. 31, a display switch 64 is additionally provided on a side surface of a viewer main body 11.

Figure 32:
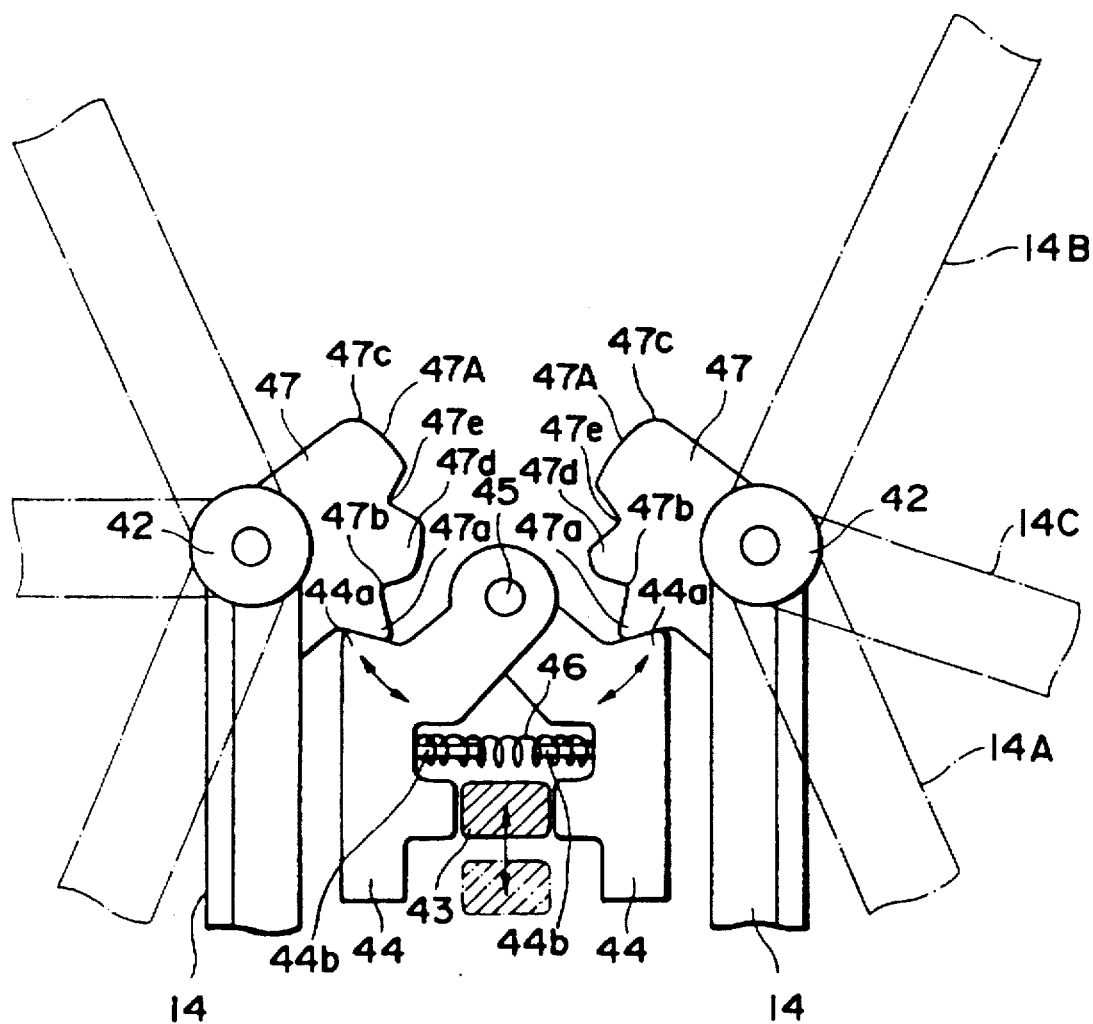

FIG. 32, which corresponds to FIG. 6, illustrates an opening and closing positioning mechanism of supporting arms 14. Description is made of points different from those in the construction shown in FIG. 6.

Another notch 47e is formed above a notch 47b, and the notch 47e connects with a notch 47b through a projected portion 47d.

When an unlocking button 41 is depressed downward, a locking plate 43 is also moved to a position indicated by dots and dashes lines. Consequently, locking is released. Therefore, levers 44 can be moved nearer to each other against a helical compression spring 46.

When both the supporting arms 14 are opened sideward, a projected portion 47a of a cam 47 is getting onto a projected portion 44a of the lever 44 while depressing the lever 44. If the projected portion 47a of the cam 47 gets over the projected portion 44a of the lever 44, the projected portion 44a enters the notch 47b of the cam 47. This is a first stable position of the supporting arms 14 which is indicated by dots and dashes lines 14A (already described in FIG. 6). The supporting arms 14 are held in their slightly opened postures.

When both the supporting arms 14 are further opened, the projected portion 44a of the lever 44 moves along the projected portion 47d of the cam 47, finally entering the notch 47e above the projected portion 47d. Consequently, the supporting arm 14 is stabilized again. This position is referred to as a third stable position. The supporting arms in this position are indicated by dots and dashes lines 14C.

The size of the projected portion 47c of the cam 47 on the right (the position of the notch 47e) and the size of the projected portion 47d of the cam 47 on the left (the position of the notch 47e) slightly differ. That is, the size of the projected portion 47d of the cam 47 on the left is slightly larger. Therefore, the supporting arm on the right leads to the third stable position when it is opened at an angle slightly smaller than 90° (for example, 70°). On the other hand, the supporting arm on the left leads to the third stable position when it is opened at approximately 90°.

When both the supporting arms 14 are further opened, the projected portion 44a of the lever 44 moves along the circular arc-shaped edge 47A, finally leading to an upper end 47c of the cam 47. In the upper end 47c, the projected portion 44a comes off a circular arc-shaped edge 47A, to be locked in a linear edge in the radial direction of the cam 47. In this position, the supporting arm 14 is held in a stable position again. This is a second stable position of the supporting arms 14 which are indicated by dots and dashes lines 14B. The supporting arms 14 are significantly opened (already described in FIG. 6).

In the first, second and third stable positions, the locking plate 43 is returned to its original position indicated by a solid line. The locking plate 43 is so urged as to be returned to the original position by the above described spring.

Figure 33:
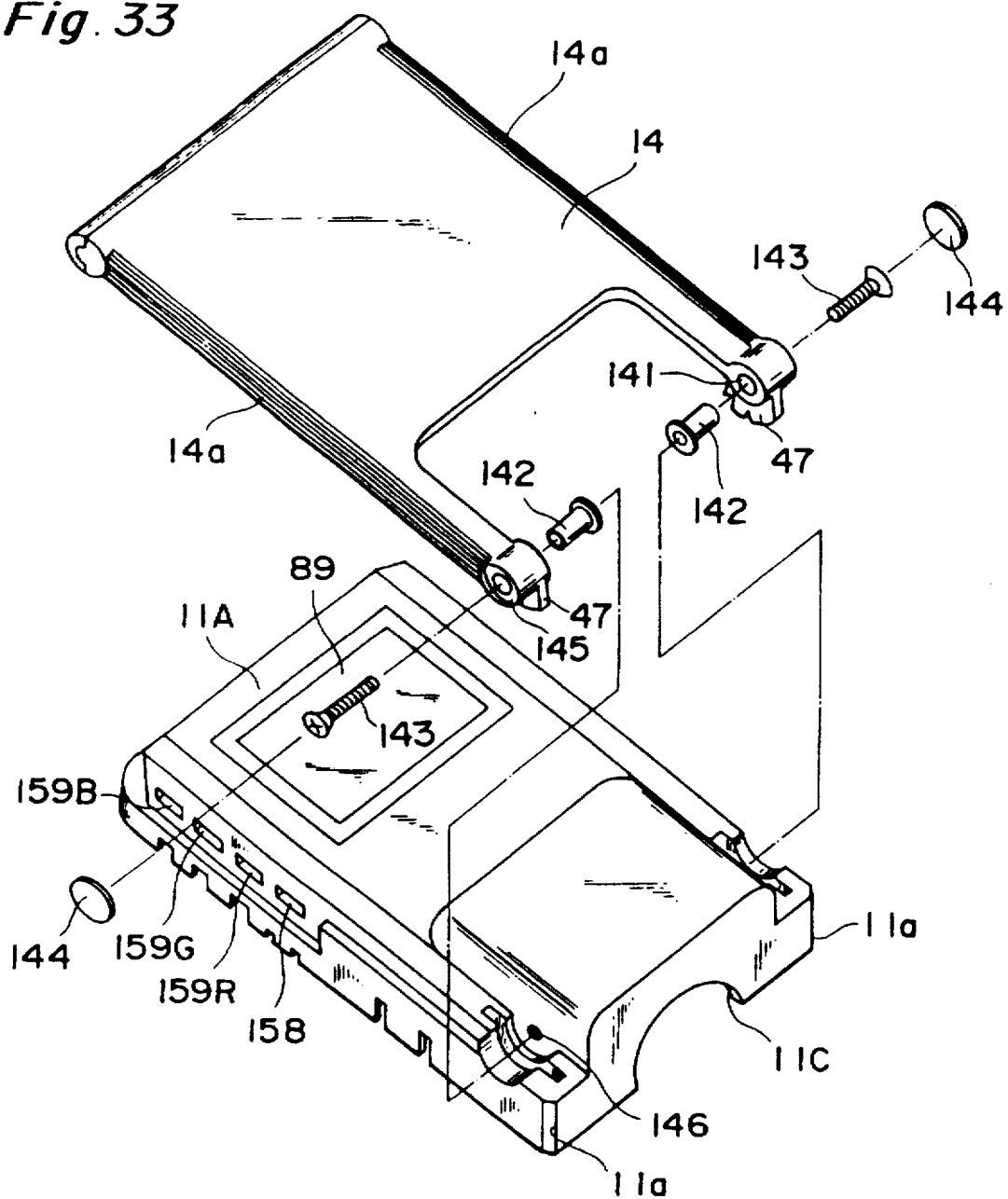

FIG. 33, which corresponds to FIG. 7, illustrates a structure in which the supporting arm 14 is mounted on the viewer main body 11.

A liquid crystal display device 89 is provided on the outer surface of one half body 11A of the viewer main body 11. The display device 89 displays an image obtained by imaging using an imaging optical system 71 and a CCD 72 in the viewer main body 11. When the supporting arm is closed (see FIGS. 1 to 3), the display device 89 is concealed by the supporting arm 14. Therefore, the display device is protected from external forces and external pressures. The other construction is the same as that shown in FIG. 7.

Figure 34:
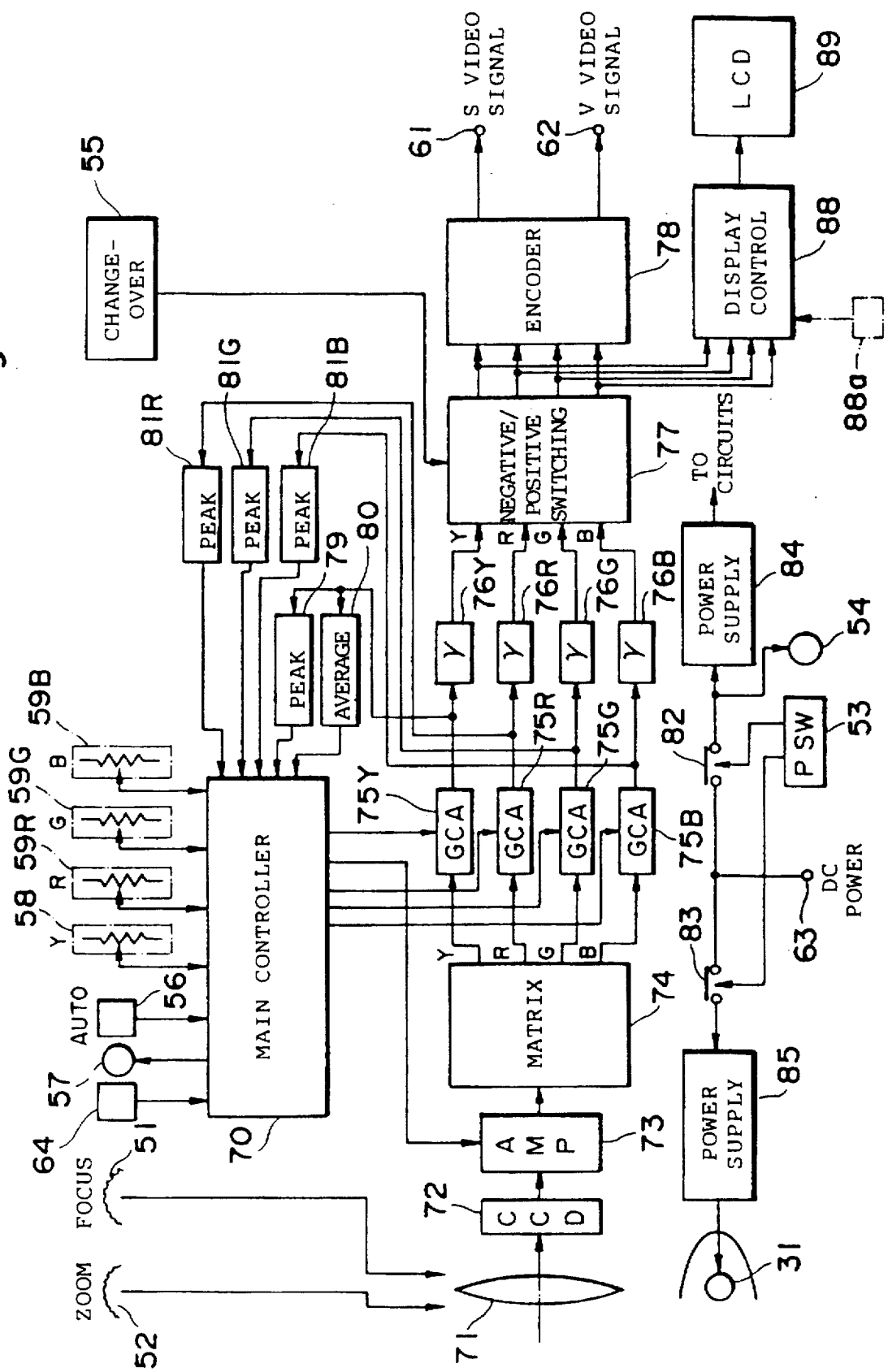

FIG. 34 shows the configuration of an optical system and electric circuitry which are contained in the viewer main body 11. FIG. 34 corresponds to FIG. 10. Description is made of points different from those shown in FIG. 10.

Signals Y, R, G and B outputted from a negative/positive switching circuit 77 are also applied to a display control circuit 88. The display control circuit 88 produces an image signal to be applied to a liquid crystal display device 89 (for example, a signal R, G and B, or a Y signal representing an image reduced by, for example, thinning processing). Consequently, an image obtained by imaging using a CCD 72 is also displayed on the display device 89. When a display switch 64 is turned on, the display control circuit 88 is enabled to operate under the control of a main control device 70. That is, only when the display switch 64 is turned on, the image obtained by imaging is displayed on the display device 89. An output signal of an encoder 78 may be applied to the display control circuit 88.

Figure 35:
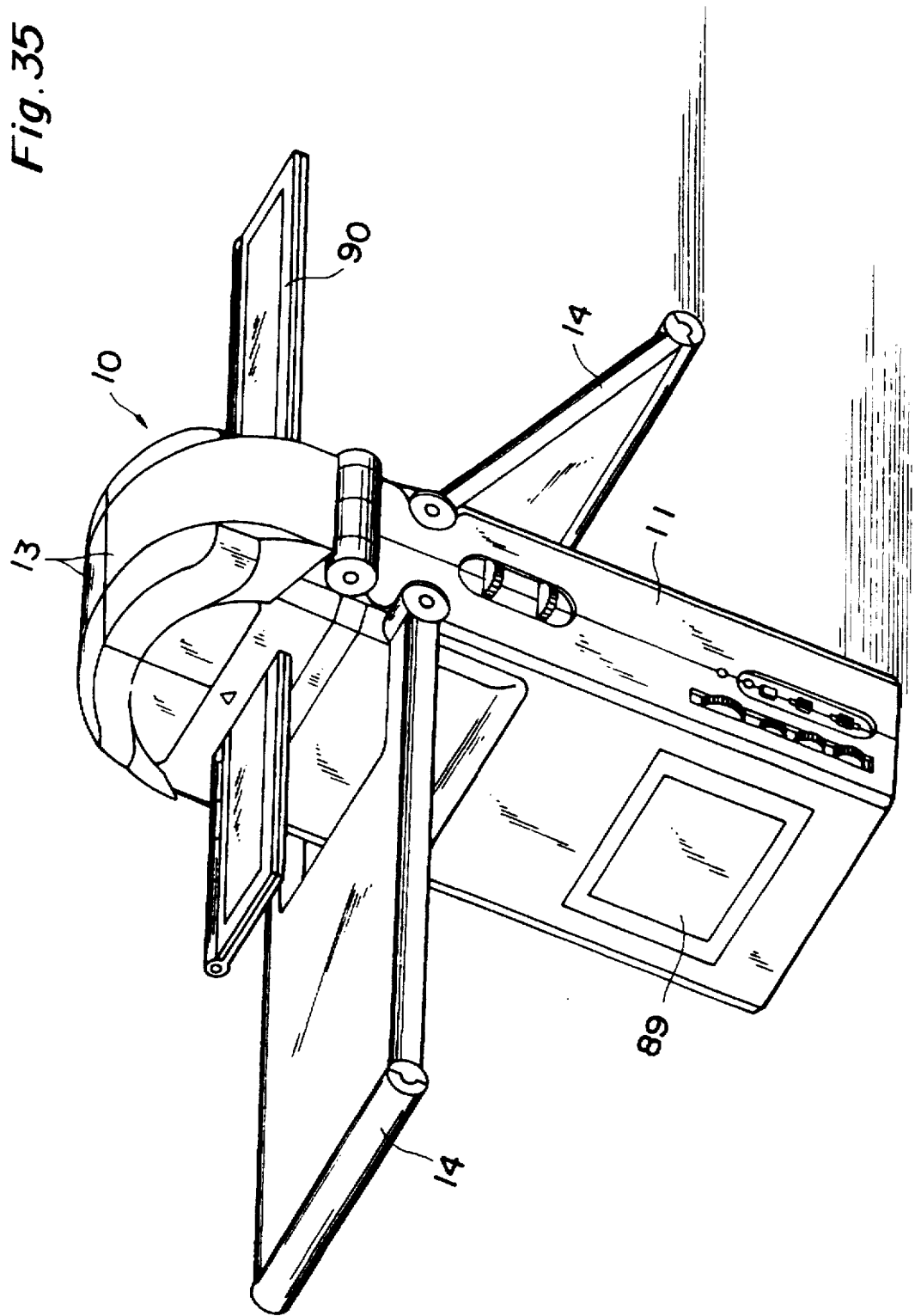
Figure 36:
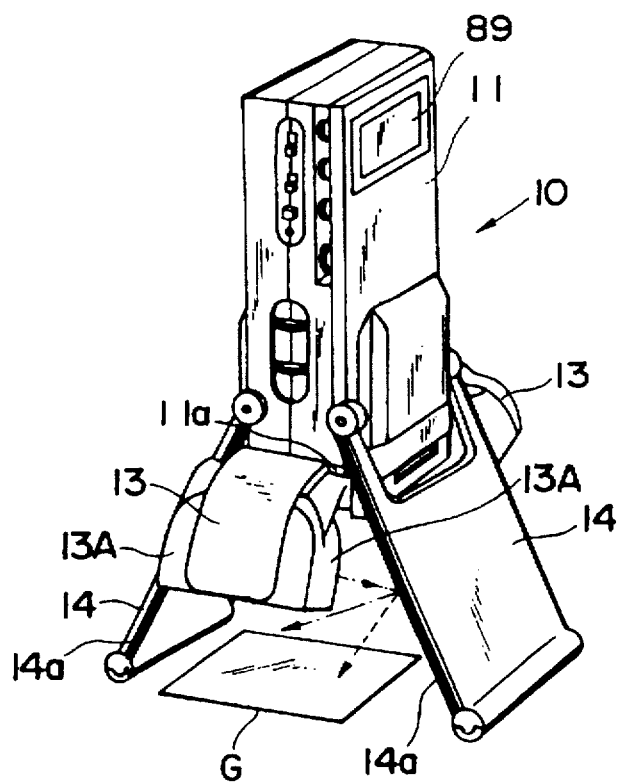

FIG. 35 illustrates a fifth manner of use utilizing the liquid crystal display device 89 mounted on the viewer main body 11. The liquid crystal display device 89 mounted on the viewer main body 11 is utilized so as to see a negative image on a negative film accommodated in a negative carrier 90 as a positive image or see an image on a slide accommodated in a slide carrier 100.

The negative carrier 90 accommodating the negative film or the slide carrier 100 accommodating the slide is inserted into an inlet 21. Head covers 13 are kept in a closed state. A lighting lamp 31 lights up by a power supply switch 53. In the case of the negative film, the negative mode is selected by a changeover switch 55.

Supporting arms 14 are opened to the third stable position. The supporting arm 14 on the right is opened at approximately 70°. The viewer main body 11 is obliquely raised, and the supporting arm 14 on the right supports the viewer main body 11. Since the supporting arm 14 on the left is opened at approximately 90°, it is possible to see the liquid crystal display device 89. The supporting arm 14 on the left shields light from a ceiling or the like, thereby to make it easy to see the display screen of the liquid crystal display device 89.

When a display switch 64 is turned on, an image of a frame, which is positioned ahead of an imaging optical system 71, on the negative film in the negative carrier 90 is displayed on the display device 89. This fifth manner of use is simple and easy because it is not necessary that an outer display device 110 is connected to the electronic viewer 10 as in the first manner of use shown in FIG. 14.

Figure 37:
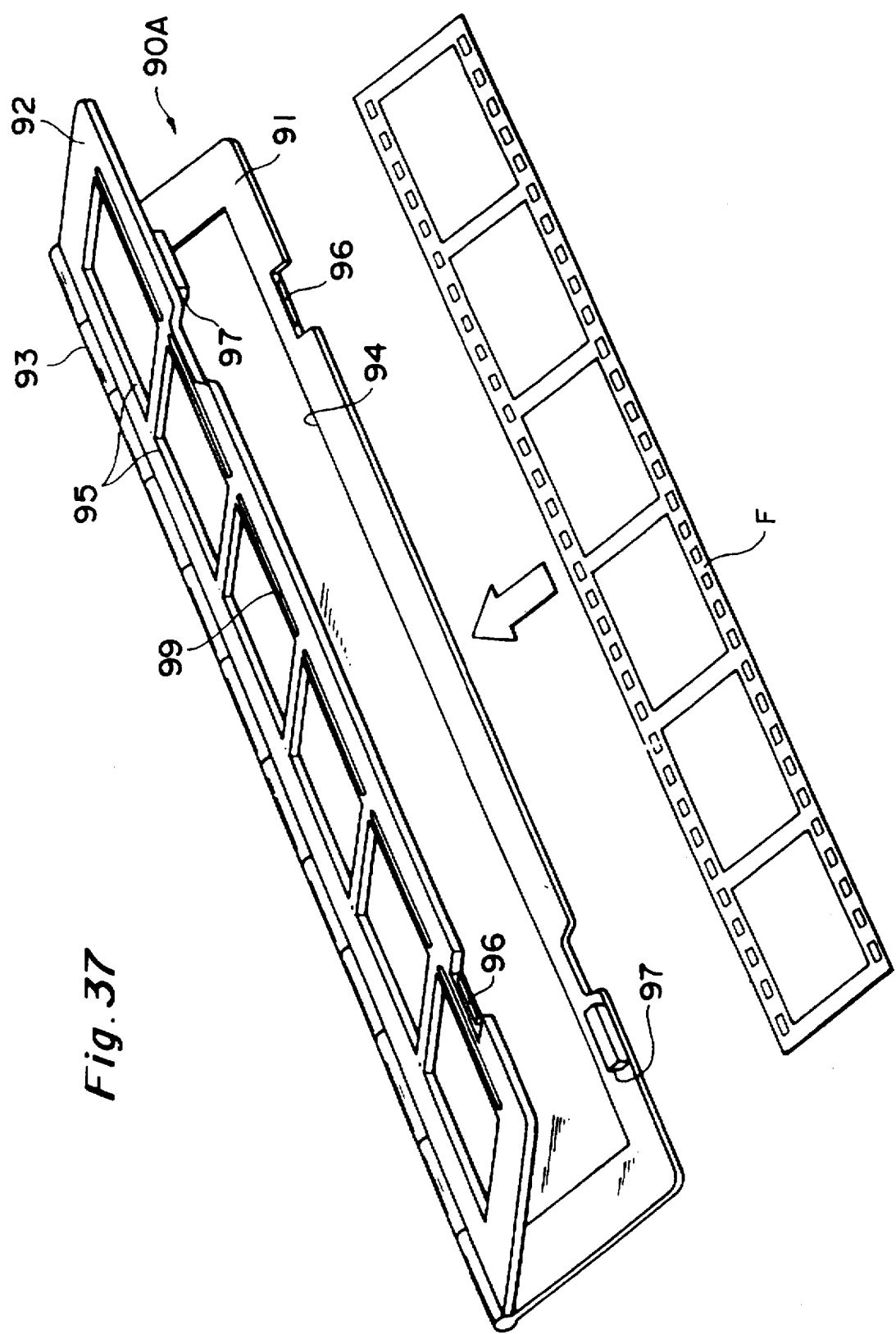

Also in the third manner of use shown in FIG. 16, it is possible to utilize the liquid crystal display device 89. FIG. 37 shows how the liquid crystal display device 89 is utilized. Specifically, a display switch 64 is turned on to display a document G on the display device 89, thereby to make it possible to see an image of the document G.

In the third manner of use, the electronic viewer 10 is inverted. If the document G is arranged upside down, therefore, it is possible to see the image of the document G with the upper and lower sides of the image conforming to the upper and lower sides of the display device 89.

Alternatively, it is preferable to employ the following construction. The viewer main body 11 is provided with an erecting/inverted changeover switch 88a (see FIG. 34). The changeover switch 88a may be one manually operated or one for sensing that the supporting arms 14 lead to the third stable position. In the later case, it is possible to employ such construction that a cam rotating together with the supporting arm 14 is provided in the position of a hinge 42 of the supporting arm 14 to perform on and off operations of the changeover switch 88a by the cam or another construction. A display direction switching circuit is provided inside the display control circuit 88. The switching circuit can be achieved by such construction that an input video signal is subjected to A/D convention, and the resulting signal is stored once in an image memory and is read out of the image memory in the opposite direction (first-in first-out). When "inverted" is detected by the changeover switch 88a, it is possible to display an erecting image on the display device 89 by operating the switching circuit.

FIG. 37 illustrates another example of a negative carrier.

Slits 99 are formed in a plate 92, in which windows 95 are formed, of the film carrier 90A. Frame numbers are generally assigned on both sides of a film F. The slits are formed in positions where the frame numbers on the film F accommodated in a recess 94 is externally visible. The other construction is the same as that shown in FIG. 11.

If in the above described electronic viewer 10, the field of view of the imaging optical system 71 is set in a range including not only windows 95 but also the slits 99 in the film carrier 90A, the frame numbers appearing through the slits 99 are also displayed on the display device 89 or 110, so that the displayed frame numbers are also visible.

The film carrier 90A is also suitably used for an electronic viewer of construction illustrated in FIG. 38 or 39 as described in the following. In the figures, the same portions as those already described are assigned the same reference numerals and hence, the overlapping description is avoided.

Figure 38:
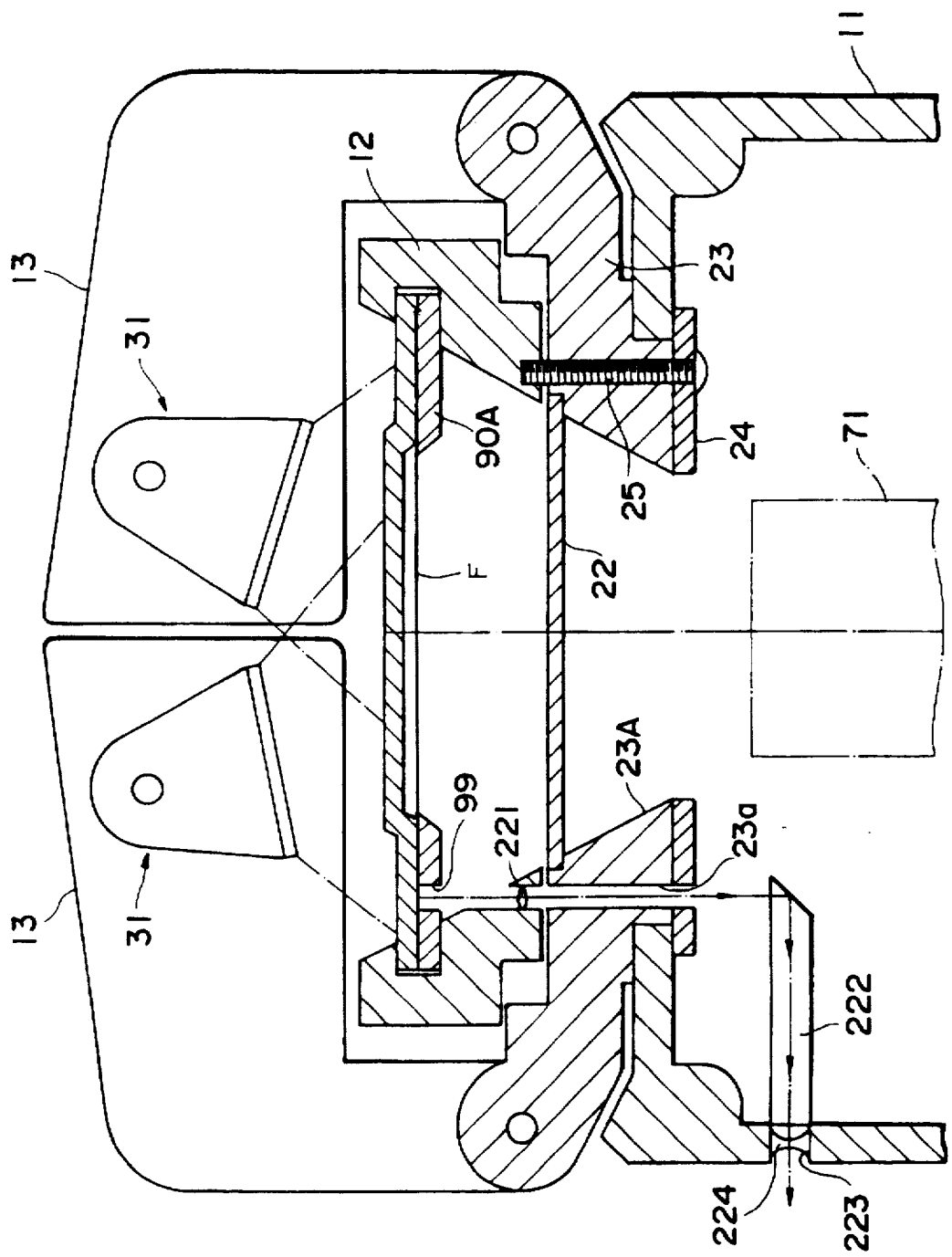

In FIG. 38, no guide is provided, and a carrier holder 12 is directly fixed to a base 23 by set screws 25. An edge of an upper opening of a viewer main body 11 is interposed between the base 23 and an end plate 24. An inner peripheral surface of the carrier holder 12 is formed into a slanting plane, and a guide groove for a film carrier 90A is formed therein. A lighting lamp 31 is obliquely arranged so that it can illuminate not only the central portion of the film carrier 90A but also the side portion thereof. Consequently, a wide illumination area is ensured.

In a position directly below a slit 99 of the film carrier 90A inserted into the carrier holder 12, a through hole (an optical path) 23a is formed in the carrier holder 12, the base 23, and the end plate 24. It is preferable that the through hole 23a is long narrow in transverse cross section, similarly to the slit 99 of the film carrier 90A. If it is determined that the position where the frame number of a frame is assigned on the film F is always the central position in the longitudinal direction of the frame, both the slit 99 and the through hole 23a may be approximately circular in cross section.

A light image of the frame number formed by illumination light passes through the through hole 23a and a prism 222 provided inside the viewer main body 11, leading to an inspection hole 223 formed on the sidewall of the viewer main body 11. A concave lens 224 is fitted in the inspection hole 223. The concave lens 224 and a convex lens 221 provided in the through hole 23 constitute one type of telescope. In such a manner, the number of a frame on the film F imaged by an imaging optical system 71 is externally visible.

Figure 39:
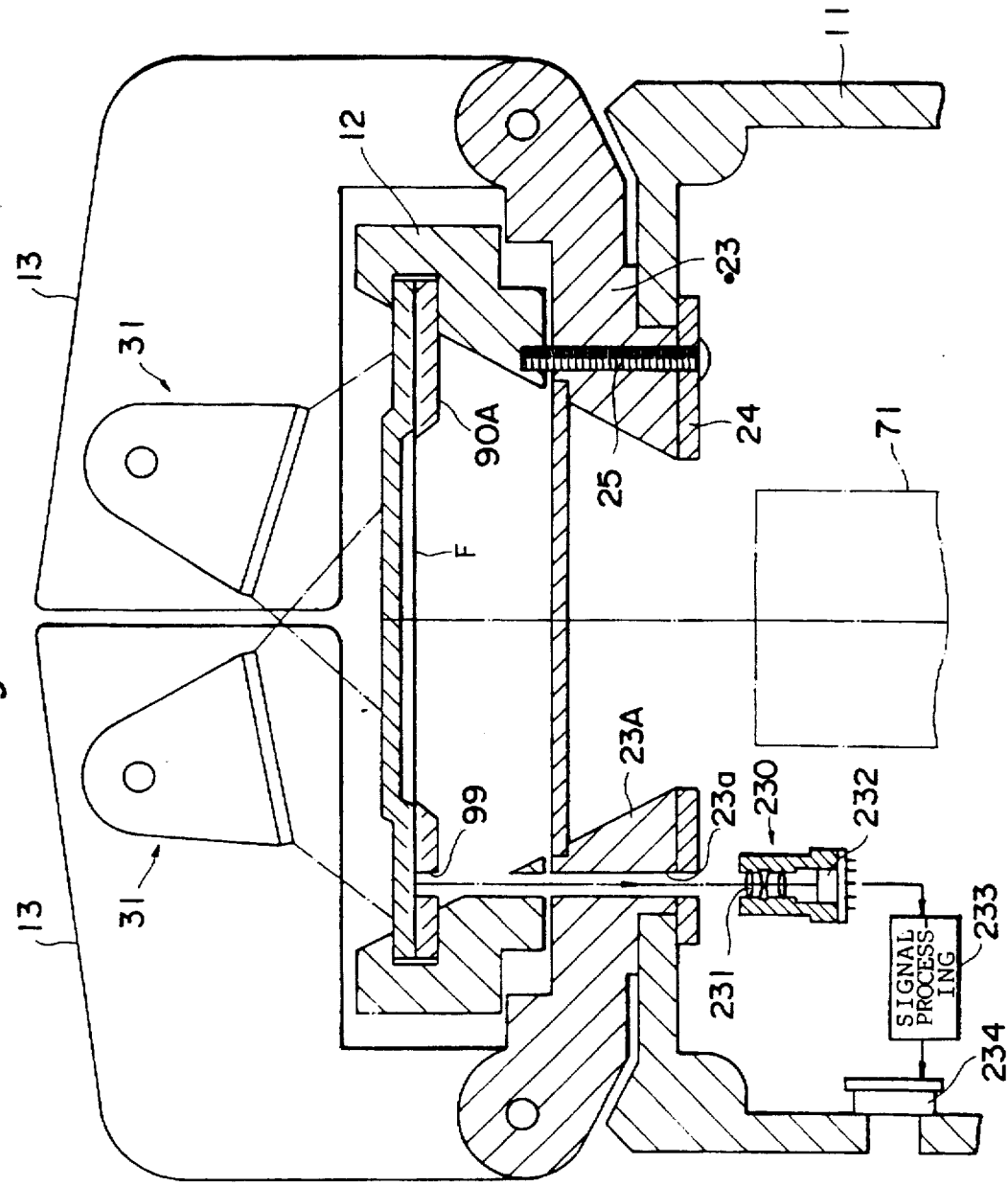

In FIG. 39, a small-sized imaging device 230 is disposed inside a viewer main body 11. The imaging device 230, which images a frame number on a film F through a through hole 23a, comprises a lens system 231 and a CCD 232. A video signal outputted from the CCD 232 is processed by a signal processing circuit 233, to be a signal suitable for display. The resulting signal is applied to a liquid crystal display device 234. The liquid crystal display device 234 is mounted on the sidewall of a carrier main body 11 so that its display screen is externally visible. As shown in FIG. 39, the display device 234 may be disposed inside a display window formed on the sidewall of the viewer main body 11 or may be mounted on the outer surface of the sidewall of the viewer main body 11.

In either case, the frame number of a frame on the film F within the field of view of an imaging optical system 71 is displayed on the display device 234.

In such a manner, a user can easily know the frame number of the frame which is imaged by the electronic viewer 10 and is displayed on the display device 110 or 89.

The electronic viewer can be realized by selecting arbitrary one or a plurality of the above described first to fourth modified examples.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic viewer comprising:
   a viewer main body containing an imaging optical system, a solid state electronic imaging device for outputting a first image signal representing an image of light incident through the imaging optical system, and an image processing circuit for correcting the first image signal outputted from the solid state electronic imaging device into a second image signal suitable for being displayed, and outputting the second image signal;
   a film carrier supporting member provided for said viewer main body for holding a detachable film carrier in a first imaging position of said imaging optical system; and
   a light source provided for said viewer main body, said light source being movable between a first position for illuminating film held in said film carrier supporting member and a second position further away from said imaging optical system relative to the first position.

2. The electronic viewer according to claim 1, further comprising:
   a head cover for covering an area viewed by said imaging optical system, said head cover being pivotably mounted on said viewer main body and capable of being opened and closed, and said head cover being provided with said light source.

3. The electronic view according to claim 1, further comprising:
   a diffusing plate holding member for holding a diffusing plate in a position between the light source in said first position and the position of the film held in said film carrier supporting member.

4. The electronic viewer according to claim 3, wherein the film carrier is provided with the diffusing plate, and:
   said film carrier supporting member is integral with said diffusing plate holding member.

5. The electronic viewer according to claim 1, further comprising at least two supporting arms capable of being opened and closed, the supporting arms being pivotally mounted on the viewer main body and being independent of said light source.

6. The electronic viewer according to claim 3, wherein said supporting arms are pivotably mounted so as to be capable of being opened to positions where they support said viewer main body against a surface which tends toward said imaging optical system from a direction viewed by said imaging optical system, and
   said supporting arms stay in the positions where they are opened and support said viewer main body.

7. The electronic viewer according to claim 6, wherein each of said supporting arms includes two sides, and steps are formed on both sides of each of said supporting arms.

8. The electronic viewer according to claim 5, wherein a weight is provided in a base end of each of said supporting arms.

9. The electronic viewer according to claim 5, wherein a non-slip surface is provided in a base end of each of said supporting arms.

10. The electronic viewer according to claim 1, further comprising:
    a circular opening formed in said viewer main body in a direction viewed by said imaging optical system, and said film carrier supporting member having a projected portion rotatably supported on said circular opening of said viewer main body, a holding portion for holding a detachable film carrier in the first imaging position, and said light source for allowing the film carrier to be illuminated when in the holding portion.

11. The electronic viewer according to claim 10, further comprising:
    a reel mounted on said projected portion of said film carrier supporting member and around which a part of an electric wire leading power to said light source is wound.

12. The electronic viewer according to claim 1, further comprising:
    a sensor for sensing whether said light source is in the first position or the second position; and
    amount-of-light adjusting means for carrying out control on the basis of a sensing output of said sensor so that the amount of light from said light source is relatively decreased when said light source is in the first position, while being relatively increased when said light source is in the second position.

13. The electric viewer according to claim 1, further comprising:
    a sensor for sensing whether the film carrier is held in said film carrier supporting member; and
    amount-of-light adjusting means for carrying out control on the basis of a sensing output of said sensor so that the amount of light from said light source is relatively decreased when the film carrier is held in said film carrier supporting member, while being relatively increased when the film carrier is not held in said film carrier supporting member.

14. The electronic viewer according to claim 1, further comprising:
    a display device provided on a side surface of said viewer main body for being supplied with the second image signal and for displaying an image represented by the second image signal.

15. The electronic viewer according to claim 14, further comprising:

a display switch for controlling the display on said display device.

16. The electronic viewer according to claim 15, wherein said display switch operates to invert the display on said display device.

17. The electronic viewer according to claim 14, further comprising:

a support arm pivotably mounted on said viewer main body for covering said display device.

18. The electronic viewer according to claim 14, wherein said viewer main body includes two supporting arms capable of being opened and closed, one of the supporting arms covering said display device when it is closed, and capable of being opened to an angle of at least 90° relative to the closed position, and of being fixed to the position where it is opened, and the other supporting arm being capable of being opened to such an extent as to support said viewer main body in a state where it stands obliquely and being fixed to the position where it is opened.

19. The electronic viewer according to claim 1, further comprising:

a passive optical system for passing an image through said viewer main body to the outside of said viewer main body so as to be viewable.

20. The electronic viewer according to claim 19, wherein the image passed by said passive optical system originates from a predetermined location located substantially at the first imaging position.

21. The electronic viewer according to claim 20, wherein the image passed by said passive optical system is a frame number.

22. The electronic viewer according to claim 1, wherein said film carrier supporting member is rotatably provided relative to said viewer main body.

23. The electronic viewer according to claim 1, further comprising:

a negative/positive changeover switch, and said image processing circuit for outputting, when a negative is designated by the negative/positive changeover switch, the second image signal representing a positive image obtained by inverting a negative image.

24. The electronic viewer according to claim 1, further comprising:

a second imaging device for viewing a predetermined location outside said viewer main body, said second imaging device including a dedicated display device for displaying the viewed location.

25. The electronic viewer according to claim 24, wherein said second imaging device is a frame number imaging device for obtaining an image representing a frame number by imaging through a frame number opening formed in the film carrier when the film carrier is held in said film carrier supporting member at the first imaging position, and said dedicated display device is provided on a wall surface of said viewer main body so that its display screen is externally visible for displaying a frame number represented by a signal outputted from said frame number imaging device.

26. The electronic viewer according to claim 25, further comprising:

a second display device provided on a side surface of said viewer main body for being supplied with the second image signal from the image processing circuit and for displaying an image represented by the second image signal from the image processing circuit.

27. The electronic viewer according to claim 1, wherein the second image signal output by said image processing circuit is a video signal suited for display by a display device.

28. An electronic viewer comprising:

a viewer main body containing an imaging optical system, a solid state electronic imaging device for outputting a first image signal representing an image of light incident through the imaging optical system, an image processing circuit for converting the first image signal outputted from the solid state electronic imaging device into a second image signal and outputting the second image signal, and a power supply circuit, and having a circular opening formed in a position viewed by said imaging optical system;

a film carrier supporting member having a projected portion rotatably supported in said circular opening of said viewer main body, a holding portion for holding a detachable film carrier in an imaging position of said imaging optical system, and an illuminating portion for illuminating the film carrier held in the holding portion; and a reel mounted on said projected portion of said film carrier supporting member and around which a part of an electric wire leading from said power supply circuit to said illuminating portion is wound.

29. The electronic viewer according to claim 28, wherein the second image signal is one of a S-video signal and a V-video signal.

30. An electronic viewer comprising:

a viewer main body containing an imaging optical system, a solid state electronic imaging device for outputting a first image signal representing an image of light incident through the imaging optical system, and an image processing circuit for converting the first image signal outputted from the solid state electronic imaging device into a second image signal and outputting the second image signal;

a film carrier supporting member provided for said viewer main body for holding a detachable film carrier in an imaging position of said imaging optical system; and two supporting arms pivotably mounted on opposite sides of said viewer main body and capable of being opened and closed, a weight being provided in a base end of each of said supporting arms.

31. The electronic viewer according to claim 30, wherein the base end of each of said supporting arms has a non-slip surface.

32. The electronic viewer according to claim 30, wherein, in their closed position, the base ends of said supporting arms project beyond a lower end of said viewer main body, and said supporting arms can be opened and held open at first positions where the base ends of said supporting arms and the lower end of the viewer main body are positioned on one plane.

33. The electronic viewer according to claim 30, wherein said supporting arms can be opened to and held at first positions where they support said viewer main body against a surface tending toward said imaging optical system in a direction corresponding to the incident light, and said supporting arms stay in the first positions.

34. The electronic viewer according to claim 30, wherein the second image signal is a video signal suited for display by a display devices.

35. An electronic viewer comprising:

a viewer main body containing an imaging optical system, a solid state electronic imaging device for outputting a first image signal representing an image of light incident through the imaging optical system, and an image processing circuit for converting the first image signal outputted from the solid state electronic imaging device into a second image signal and outputting the second image signal;

a film carrier supporting member provided for said viewer main body for holding a detachable film carrier in an imaging position of said imaging optical system;

a light source provided for viewer main body so as to be movable between a first position for illuminating the film held in said film carrier supporting member and a second position toward a side of said viewer main body;

a sensor for sensing whether said light source is in the first position or the second position; and amount-of-light adjusting means for carrying out control on the basis of a sensing output of said sensor so that the amount of light from said light source is relatively decreased when said light source is in the first position, while being relatively increased when said light source is in the second position.

36. The electronic viewer according to claim 35, further comprising:

a head cover for covering an area viewed by said imaging optical system, said head cover being pivotably mounted on said viewer main body and capable of being opened and closed, and said head cover being provided with said light source.

37. The electronic viewer according to claim 35 further comprising at least two supporting arms capable of being opened and closed, the supporting arms being pivotably mounted on the viewer main body.

38. The electronic viewer according to claim 35, wherein the second image signal is a video signal suited for display by a display device.

39. An electronic viewer comprising:

a viewer main body containing an imaging optical system, a solid state electronic imaging device for outputting a first image signal representing an image of light incident through the imaging optical system, and an image processing circuit for converting the first image signal outputted from the solid state electronic imaging device into a second image signal and outputting the second image signal;

a film carrier supporting member provided for said viewer main body for holding a detachable film carrier in an imaging position of said imaging optical system;

a light source provided for viewer main body so as to be movable between a first position for illuminating in a first direction toward the film held in said film carrier supporting member, and a second position further away from said viewer main body and pointing in a direction different from the first direction;

a sensor for sensing whether the film carrier is held in said film carrier supporting member; and amount-of-light adjusting means for carrying out control on the basis of a sensing output of said sensor so that the amount of light from said light source is relatively decreased when the film carrier is held in said film carrier supporting member, while being relatively increased when the film carrier is not held in said film carrier supporting member.

40. The electronic viewer according to claim 39, further comprising:

a head cover for covering an area viewed by said imaging optical system, said head cover being pivotably mounted on said viewer main body and capable of being opened and closed, and said head cover being provided with said light source.

41. The electronic viewer according to claim 39, further comprising at least two supporting arms capable of being opened and closed, the supporting arms being pivotably mounted on the viewer main body.

42. The electronic viewer according to claim 39, wherein the second image signal is a video signal suited for display by a display device.

43. An electronic viewer comprising:

a viewer main body containing an imaging optical system, a solid state electronic imaging device for outputting a first image signal representing an image of light incident through the imaging optical system, and an image processing circuit for converting the first image signal outputted from the solid state electronic imaging device into a second image signal and outputting the second image signal;

a film carrier supporting member provided for said viewer main body for holding a detachable film carrier in a first imaging position of said imaging optical system;

a display device provided on a side surface of said viewer main body for displaying an image represented by the second image signal outputted from said image processing circuit; and a first supporting arm pivotably mounted on said viewer main body for covering said display device.

44. The electronic viewer according to claim 43, further comprising:

a second supporting arm capable of being opened and closed, wherein said first supporting arm covers said display device when pivoted to a closed position, and is capable of being opened to an angle of at least 90° and of staying in the opened position, and said second supporting arm capable of being opened to a stand position to support said viewer main body in an oblique position, said second supporting arm staying in the stand position.

45. The electronic viewer according to claim 43, further comprising:

a second supporting arm capable of being opened and closed, said first and second supporting arms being capable of being opened to positions where they support said viewer main body at an elevation in a state where said solid state electronic imaging device views downward.

46. The electronic viewer according to claim 45, further comprising:

a switching circuit for converting the second image signal outputted from said image processing circuit into an upside-down image signal representing an image obtained by turning an image represented by the second image signal upside down, the upside-down image signal outputted from the switching circuit being applied to said display device.

47. The electronic viewer according to claim 46, further comprising:

a switch for sensing that said supporting arms are opened to the support positions, said switching circuit converting the second image signal in response to a signal from said switch.

48. The electronic viewer according to claim 46, further comprising:

a manually operated changeover switch, said switching circuit converting the second image signal in response to said manually operated changeover switch.

49. The electronic viewer according to claim 43, further comprising:

a passive optical system for passing an image through said viewer main body to the outside of said viewer main body so as to be viewable.

50. The electronic viewer of claim 49, wherein the image passed by said passive optical system is obtained through a predetermined opening formed in the detachable film carrier held by said film carrier holding member.

51. The electronic viewer of claim 43 further comprising:

a second imaging device viewing a predetermined location outside said viewer main body, said second imaging device including a second display device having a display screen for displaying images from the viewed location.

52. The electronic viewer according to 51, wherein said second imaging device is a frame number imaging device for imaging an image representing a frame number obtained through a frame number opening formed in the film carrier held in said film carrier supporting member, and said second display device includes a display screen provided on a wall surface of said viewer main body so that the display screen is externally visible for displaying a frame number represented by a signal outputted from said frame number imaging device.

53. The electronic viewer according to claim 43, wherein the second image signal is a video signal.

54. An electronic viewer comprising:

a viewer main body containing an imaging optical system, a solid state electronic imaging device for outputting a first image signal representing an image of light incident through the imaging optical system, and an image processing circuit for converting the first image signal outputted from the solid state electronic imaging device into a second image signal and outputting the second image signal;

a film carrier supporting member provided for said viewer main body for holding a detachable film carrier in an imaging position of said imaging optical system; and an optical system for passing an image representing a frame number obtained through a frame number opening formed in the film carrier held in said film carrier supporting member through said viewer main body so as to be viewable from the outside.

55. The electronic viewer according to claim 54, wherein the second image signal is a video signal suited for display by a display device.

56. An electronic viewer comprising:

a viewer main body containing an image optical system, a solid state electronic imaging device for outputting a first image signal representing an image of light incident through the imaging optical system, and an image processing circuit for converting the first image signal outputted from the solid state electronic imaging device into a second image signal and outputting the second image signal;

a film carrier supporting member provided for said viewer main body for holding a film carrier in an imaging position of said imaging optical system;

a frame number imaging device for imaging an image of a frame number obtained through a frame number opening formed in the film carrier held in said film carrier supporting member; and a display device provided with a display screen on a wall surface of said viewer main body so that said display screen is externally visible for displaying a frame number represented by a signal outputted from said frame number imaging device.

57. The electronic viewer of claim 56, wherein the second image signal is one of a S-video signal and a V-video signal.

58. The electronic viewer of claim 56, wherein the signal outputted from said frame number imaging device is a video signal suited for display by said display device.

59. An electronic viewer, comprising:

a viewer main body containing an imaging optical system, a solid state electronic imaging device for outputting a first image signal representing an image of light incident through the imaging optical system, and an image processing circuit for converting the first image signal outputted from the solid state electronic imaging device into a second image signal and outputting the second image signal;

a film carrier supporting member provided for said view main body, for holding a detachable film carrier in an imaging position of said imaging optical system; and two supporting arms pivotably mounted on opposite sides of said viewer main body and capable of being pivoted to and held at a plurality of positions, the plurality of positions including, for each supporting arm:

a first position in which the supporting arm lies generally flush with a side of said viewer main body, a second position in which the supporting arm lies at an acute angle with respect to the first position in order to support, in use, said viewer main body against an external surface, and a third position in which the supporting arm lies at an obtuse angle with respect to the first position in order to support, in use, said viewer main body against an external surface.

60. The electronic viewer according to claim 59, wherein said supporting arms are individually pivotable to their respective first, second, and third positions.

61. The electronic viewer according to claim 59, wherein the first, second, and third positions are discrete positions, each supporting arm including:

a cam formed generally at a pivot of said supporting arm, the cam having an arc-shaped edge with first, second, and third notches formed in the edge corresponding to each of the first, second, and third positions of said supporting arm, said viewer further comprising, for each supporting arm, a lever for engaging one of the notches.

62. The electronic viewer according to claim 61, wherein said levers are displaceable in order to engage into and to disengage from the notches, said viewer further comprising:

a lock selectively placeable at a locking position and at an unlocking position, the locking position blocking said levers from displacing.

63. The electronic viewer according to claim 62, wherein said lock may be placed in the locking position when said supporting arms are in any of the first, second, and third positions.

64. The electronic viewer according to claim 59, wherein, when said two supporting arms are in the second position, respective ends of said supporting arms are arranged coplanar with an end surface of said viewer main body.

65. The electronic viewer according to claim 59, wherein, when said supporting arms are both in the third position, respective ends of said supporting arms extend in a direction generally viewed by the imaging device and beyond an end surface of said viewer main body.

66. The electronic viewer according to claim 30, further comprising a light source movable between a first position for illuminating film held in said film carrier supporting member and a second position further away from said viewer main body, said light source being independent of said two supporting arms.

* * * * *